(12) United States Patent
Shiiyama

(10) Patent No.: US 7,418,135 B2
(45) Date of Patent: Aug. 26, 2008

(54) IMAGE PROCESSING APPARATUS, METHOD THEREFOR, AND PROGRAM

(75) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/202,076

(22) Filed: Aug. 12, 2005

(65) Prior Publication Data
US 2006/0188159 A1     Aug. 24, 2006

(30) Foreign Application Priority Data
Aug. 24, 2004    (JP)    ............... 2004-244128

(51) Int. Cl.
*G06K 9/00* (2006.01)
(52) U.S. Cl. ...................... 382/181; 382/141
(58) Field of Classification Search ............ None
See application file for complete search history.

(56) References Cited

U.S. PATENT DOCUMENTS

| | | | | |
|---|---|---|---|---|
| 4,641,353 | A * | 2/1987 | Kobayashi | 382/144 |
| 5,905,811 | A | 5/1999 | Shiiyama et al. | 382/229 |
| 6,865,288 | B1 | 3/2005 | Shishido et al. | 382/145 |
| 7,116,816 | B2 * | 10/2006 | Tanaka et al. | 382/149 |
| 2005/0271261 | A1 * | 12/2005 | Onishi et al. | 382/149 |

FOREIGN PATENT DOCUMENTS

| | | |
|---|---|---|
| JP | 5-232038 | 9/1993 |
| JP | 2001-22935 | 1/2001 |

* cited by examiner

*Primary Examiner*—Matthew C Bella
*Assistant Examiner*—Alex Liew
(74) *Attorney, Agent, or Firm*—Fitzpatrick, Cella, Harper & Scinto

(57) ABSTRACT

An image processing apparatus which decides a comparison position for performing similarity comparison between a comparison source image and a comparison destination image. A comparison source image and comparison destination image are divided into a plurality of blocks. Feature amounts of the images are calculated for each divided block. The similarity distance between the images are calculated after shifting on the basis of the feature amounts of corresponding blocks in the images. A position correction amount for correcting the comparison positions of the images is calculated on the basis of the size of the block and a position shifting pattern. Every time the position correction amount is calculated, the designated block division count is incremented, and the process is recursively executed. When recursive processing is determined to be ended, a comparison position at this time is finalized as the final comparison positions of the images.

25 Claims, 12 Drawing Sheets

FIG. 4

| | BLOCK DIVISION COUNT 16 | BLOCK DIVISION COUNT 32 | BLOCK DIVISION COUNT 64 |
|---|---|---|---|
| LATERAL DIMENSION OF COMPARISON SOURCE: 150 | 9, REMAINDER 6 | 4, REMAINDER 22 | 2, REMAINDER 22 |
| LATERAL DIMENSION OF COMPARISON DESTINATION: 300 | 18, REMAINDER 12 | 9, REMAINDER 16 | 4, REMAINDER 44 |

FIG. 6
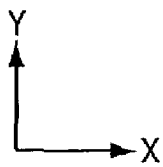
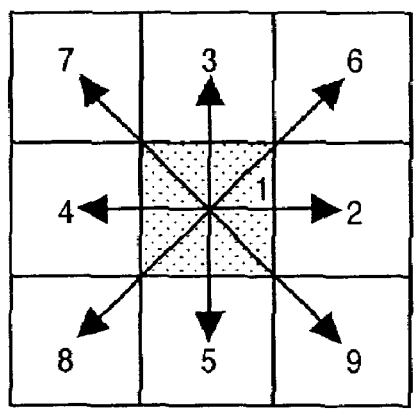
UNIT VECTOR OF EACH DIRECTION
UNIT VECTOR IN BLOCK
POSITION SHIFTING DIRECTION
V(1)=(0,0,)
V(2)=(1,0,)
V(3)=(0,1,)
V(4)=(-1,0,)
V(5)=(0,-1,)
V(6)=(1,1,)
V(7)=(-1,1,)
V(8)=(-1,-1,)
V(9)=(1,-1,)

EXAMPLE OF COMPARISON WHEN BLOCKS
ARE SHIFTED IN DIRECTION 9

IMAGE PROCESSING APPARATUS, METHOD THEREFOR, AND PROGRAM

FIELD OF THE INVENTION

The present invention relates to an image processing apparatus which decides a comparison position for performing similarity comparison between a comparison source image and a comparison destination image, a method therefor, and a program.

BACKGROUND OF THE INVENTION

As a conventional technique associated with pattern inspection for detecting a defect by comparing successively input images to be inspected with a reference image as an example of similarity comparison, there are known Japanese Patent Laid-Open Nos. 5-232038 and 2001-22935.

In Japanese Patent Laid-Open No. 5-232038, a difference image signal between an image signal of N×M pixels which is acquired from an image signal of an image to be inspected, and an image signal of N×M pixels which is acquired from an image signal of a reference image stored in a memory is calculated while the image is shifted pixel by pixel up to a maximum pixel count M designated in advance in the horizontal and vertical directions. The absolute values of difference image signals are added by an addition circuit, and a minimum value is detected by a minimum value detection circuit, decreasing a difference at a pattern edge and detecting only a defect.

In Japanese Patent Laid-Open No. 2001-22935, alignment is executed at a plurality of stages (a stage for a region having a large number of pixels and a stage for a region having a small number of pixels) on the basis of electron beam image signals successively detected from an object to be inspected in which various fine patterns coexist, thereby reducing alignment errors at high precision of subpixel order. The frequency of erroneous detection of a normal fine pattern can be reduced, and a small defect generated on a fine pattern can be accurately inspected without missing such a defect.

However, according to Japanese Patent Laid-Open No. 5-232038, when the shift range is wide, the calculation cost greatly rises. The difference between image signals can be recognized at only a precision of an N×M block.

In Japanese Patent Laid-Open No. 2001-22935, position shifting matching is executed at a low resolution, and the position shifting range at the next resolution is limited in accordance with the degree and continuity of matching, realizing both high speed and high precision.

In initial matching targeted to a divided block of many pixels, matching is done while shifting the position of the divided block in steps of unitary pixels. When a block of a wide region has several ten to several hundred pixels, comparison processing in the square order must be performed at this stage in performing matching tolerant of a position shift almost close to the block size. Considering the polarity of the matching distance by position shifting, position shifting is done in a more restricted range in subsequent detail matching, and then detail matching is executed to detect a difference. In this case, the precision is high, but the calculation cost rises, and high-speed search cannot be expected.

SUMMARY OF THE INVENTION

The present invention has been made to overcome the conventional drawbacks, and has as its object to provide an image processing apparatus capable of efficiently deciding a comparison position for performing similarity comparison between a comparison source image and a comparison destination image, a method therefor, and a program.

According to the present invention, the foregoing object is attained by providing an image processing apparatus which decides a comparison position for performing similarity comparison between a comparison source image and a comparison destination image, comprising:

designation means for designating a block division count representing a division count for dividing an image;

dividing means for dividing each of the comparison source image and the comparison destination image into a plurality of blocks by the block division count designated by the designation means;

feature amount calculation means for calculating feature amounts of the comparison source image and the comparison destination image for each block divided by the dividing means;

storing means for storing a plurality of types of position shifting patterns for shifting comparison positions of the comparison source image and the comparison destination image;

similarity distance calculation means for calculating, on the basis of feature amounts of corresponding blocks in the comparison source image and the comparison destination image, a similarity distance between the comparison source image and the comparison destination image after the comparison positions are shifted by using the plurality of types of position shifting patterns;

position correction amount calculation means for calculating a position correction amount for correcting the comparison positions of the comparison source image and the comparison destination image that are used in performing next similarity comparison, on the basis of a size of the block and a position shifting pattern corresponding to a smallest similarity distance among similarity distances calculated by the similarity distance calculation means;

correction means for correcting the comparison positions of the comparison source image and the comparison destination image by the position correction amount;

executing means for, every time the position correction amount is calculated by the position correction amount calculation means, incrementing the block division count designated by the designation means, and recursively executing the means from the dividing means to the correction means;

determination means for determining whether to end recursive processing; and finalizing means for, when the recursive processing is to be ended on the basis of a determination result by the determination means, finalizing a comparison position at that time as final comparison positions of the comparison source image and the comparison destination image.

In a preferred embodiment, the apparatus further comprises deciding means for deciding a comparison source region of the comparison source image and a comparison destination region of the comparison destination image, wherein the dividing means divides each of an image in the comparison source region and an image in the comparison destination region into a plurality of blocks.

In a preferred embodiment, the apparatus further comprises scaling means for, when a size of the comparison source region and a size of the comparison destination region which are decided by the deciding means are different, scaling at least one region so as to make the sizes equal to each other.

In a preferred embodiment, the apparatus further comprises generation means for generating difference information between the comparison source image and the comparison destination image on the basis of the comparison positions finalized by the finalizing means.

In a preferred embodiment, the apparatus further comprises level conversion means for, when feature amount levels of the images in the comparison source region and the comparison destination region which are decided by the deciding means are different, converting the feature amount level of the image in at least one region so as to make the feature amount levels equal to each other.

In a preferred embodiment, when both the image in the comparison source region and the image in the comparison destination region are color images, the feature amount calculation means calculates, as the feature amount, an average of color channels in each color image for each block divided by the dividing means, when one of the image in the comparison source region and the image in the comparison destination region is a color image and the other is a grayscale image, or both of the images are grayscale images, the feature amount calculation means calculates an average brightness of each image as the feature amount for each block divided by the dividing means, and when at least one of the image in the comparison source region and the image in the comparison destination region is a binary image, the feature amount calculation means calculates, as the feature amount for each block divided by the dividing means, a value which is a majority of the binary image.

In a preferred embodiment, when both the image in the comparison source region and the image in the comparison destination region are color images, the generation means generates difference information on the color images on the basis of the position correction amount finalized by the finalizing means, when one of the image in the comparison source region and the image in the comparison destination region is a color image and the other is a grayscale image, or both of the images are grayscale images, the generation means generates difference information on the grayscale images on the basis of the position correction amount finalized by the finalizing means, and when at least one of the image in the comparison source region and the image in the comparison destination region is a binary image, the generation means generates difference information on the binary image on the basis of the position correction amount finalized by the finalizing means.

In a preferred embodiment, the apparatus further comprises scaling means for, when a size of the comparison source region and a size of the comparison destination region which are decided by the deciding means are different, scaling at least one region so as to make the sizes equal to each other, wherein the generation means generates, on the basis of the position correction amount finalized by the finalizing means, difference information between the image in the comparison source region and the image in the comparison destination region after scaling by the scaling means.

In a preferred embodiment, position shifting directions defined by the plurality of types of position shifting patterns are a total of five directions including two horizontal directions, two vertical directions, and one fixed direction.

In a preferred embodiment, position shifting directions defined by the plurality of types of position shifting patterns are a total of nine directions including two horizontal directions, two vertical directions, four oblique directions, and one fixed direction.

In a preferred embodiment, the designation means comprises block division count calculation means for calculating a block division count larger than the block division count in previous similarity comparison by multiplying the block division count in previous similarity comparison by a predetermined constant, and the executing means updates the block division count calculated by the block division count calculation means as a new block division count every time the position correction amount is calculated by the position correction amount calculation means unless the block division count calculated by the block division count calculation means exceeds an upper limit block division count.

In a preferred embodiment, when a second smallest similarity distance which falls within a product of the smallest similarity distance multiplied by a first constant exists in similarity distances calculated by the similarity distance calculation means, the position correction amount calculation means calculates a position correction amount for correcting the comparison positions of the comparison source image and the comparison destination image that are used in performing next similarity comparison, on the basis of the size of the block and position shifting patterns corresponding to the smallest similarity distance and the second smallest similarity distance, and when a second smallest similarity distance which falls within the product of the smallest similarity distance multiplied by the first constant does not exist, the position correction amount calculation means calculates a position correction amount for correcting the comparison positions of the comparison source image and the comparison destination image that are used in performing next similarity comparison, on the basis of the size of the block and a position shifting pattern corresponding to the smallest similarity distance.

In a preferred embodiment, the designation means designates, as the block division count, a horizontal block division count for dividing the comparison region in a horizontal direction and a vertical block division count for dividing the comparison region in a vertical direction, the position correction amount calculation means calculates the position correction amount which contains a lateral component corresponding to the horizontal direction and a longitudinal component corresponding to the vertical direction, when a horizontal block division count obtained by multiplying the horizontal block division count in previous similarity comparison by a predetermined constant exceeds an upper limit horizontal block division count, the longitudinal component of the position correction amount is set to a value obtained by multiplying a longitudinal component of the position shifting pattern by the vertical block division count, and the lateral component of the position correction amount is set to a value of a lateral component of the position shifting pattern, when a vertical block division count obtained by multiplying the vertical block division count in previous similarity comparison by a predetermined constant exceeds an upper limit vertical block division count, the longitudinal component of the position correction amount is set to a value of the longitudinal component of the position shifting pattern, and the lateral component of the position correction amount is set to a value obtained by multiplying the lateral component of the position shifting pattern by the horizontal block division count, and when the horizontal block division count obtained by multiplying the horizontal block division count in previous similarity comparison by the predetermined constant exceeds the upper limit horizontal block division count, and the vertical block division count obtained by multiplying the vertical block division count by the predetermined constant exceeds the upper limit vertical block division count, the longitudinal component of the position correction amount is set to the value obtained by multiplying the longitudinal component of the position shifting pattern by the vertical block division count, and the lateral component of the position correction amount is set to the value obtained by multiplying the lateral component of the position shifting pattern by the horizontal block division count.

In a preferred embodiment, the determination means determines whether to end the recursive processing, on the basis of a processing count of the recursive processing after the block division count designated by the designation means reaches an upper limit block division count.

In a preferred embodiment, the determination means determines whether to end the recursive processing, on the basis of the position correction amount in determination and a processing count of the recursive processing after the block division count designated by the designation means reaches an upper limit block division count.

In a preferred embodiment, the determination means determines whether to end the recursive processing, on the basis of a processing count of the recursive processing, the position correction amount in determination, the block division count, and the smallest similarity distance.

In a preferred embodiment, an upper limit block division count of the block division count designated by the designation means is decided by a size of the comparison region.

In a preferred embodiment, the designation means comprises block division count calculation means for calculating a block division count larger than the block division count in previous similarity comparison by multiplying the block division count in previous similarity comparison by a predetermined constant, and the predetermined constant is a value falling within a range from 1.0 to 2.0.

In a preferred embodiment, the generation means generates the difference information on the basis of one of a pixel difference value between corresponding pixels in the comparison source image and the comparison destination image, a value calculated by dividing a cumulative value of an absolute pixel difference value between pixels by the number of pixels in the comparison region, coordinate information which is converted into a size of each of the comparison source image and the comparison destination image, and a combination thereof.

In a preferred embodiment, the generation means comprises acquisition means for acquiring a pixel difference value which is not less than a predetermined threshold among pixel difference values between corresponding pixels in the comparison source image and the comparison destination image, and quantization means for quantizing the pixel difference value acquired by the acquisition means, and the generation means generates, as the difference information, an image in which in the comparison source image, a pixel having a pixel difference value which belongs to each quantization level of the quantization means is displayed in a color different for each quantization level.

In a preferred embodiment, the generation means comprises acquisition means for acquiring a pixel difference value which is not less than a predetermined threshold among pixel difference values between corresponding pixels in the comparison source image and the comparison destination image, and the generation means generates, as the difference information, an image in which in the comparison source region, a pixel corresponding to a pixel difference value acquired by the acquisition means is displayed in a predetermined color.

In a preferred embodiment, the predetermined threshold is a positive value including 0.

According to the present invention, the foregoing object is attained by providing an image processing method of deciding a comparison position for performing similarity comparison between a comparison source image and a comparison destination image, comprising:

a designation step of designating a block division count representing a division count for dividing an image;

a dividing step of dividing each of the comparison source image and the comparison destination image into a plurality of blocks by the block division count designated in the designation step;

a feature amount calculation step of calculating feature amounts of the comparison source image and the comparison destination image for each block divided in the dividing step;

a similarity distance calculation step of calculating, on the basis of feature amounts of corresponding blocks in the comparison source image and the comparison destination image, a similarity distance between the comparison source image and the comparison destination image after comparison positions are shifted by using a plurality of types of position shifting patterns for shifting the comparison positions of the comparison source image and the comparison destination image;

a position correction amount calculation step of calculating a position correction amount for correcting the comparison positions of the comparison source image and the comparison destination image that are used in performing next similarity comparison, on the basis of a size of the block and a position shifting pattern corresponding to a smallest similarity distance among similarity distances calculated in the similarity distance calculation step;

a correction step of correcting the comparison positions of the comparison source image and the comparison destination image by the position correction amount;

an executing step of, every time the position correction amount is calculated in the position correction amount calculation step, incrementing the block division count designated in the designation step, and recursively executing the steps from the dividing step to the correction step;

a determination step of determining whether to end recursive processing; and a finalizing step of, when the recursive processing is to be ended on the basis of a determination result in the determination step, finalizing a comparison position at that time as final comparison positions of the comparison source image and the comparison destination image.

According to the present invention, the foregoing object is attained by providing a computer program for implementing image processing of deciding a comparison position for performing similarity comparison between a comparison source image and a comparison destination image, comprising:

a program code for a designation step of designating a block division count representing a division count for dividing an image;

a program code for a dividing step of dividing each of the comparison source image and the comparison destination image into a plurality of blocks by the block division count designated in the designation step;

a program code for a feature amount calculation step of calculating feature amounts of the comparison source image and the comparison destination image for each block divided in the dividing step;

a program code for a similarity distance calculation step of calculating, on the basis of feature amounts of corresponding blocks in the comparison source image and the comparison destination image, a similarity distance between the comparison source image and the comparison destination image after comparison positions are shifted by using a plurality of types of position shifting patterns for shifting the comparison positions of the comparison source image and the comparison destination image;

a program code for a position correction amount calculation step of calculating a position correction amount for correcting the comparison positions of the comparison source image and the comparison destination image that are used in performing next similarity comparison, on the basis of a size of the block and a position shifting pattern corresponding to a smallest similarity distance among similarity distances calculated in the similarity distance calculation step;

a program code for a correction step of correcting the comparison positions of the comparison source image and the comparison destination image by the position correction amount;

a program code for an executing step of, every time the position correction amount is calculated in the position correction amount calculation step, incrementing the block division count designated in the designation step, and recursively executing the steps from the dividing step to the correction step;

a program code for a determination step of determining whether to end recursive processing; and a program code for a finalizing step of, when the recursive processing is to be ended on the basis of a determination result in the determination step, finalizing a comparison position at that time as final comparison positions of the comparison source image and the comparison destination image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a table for explaining caution to be exercised in block division according to the embodiment of the present invention;

FIG. 6 is a view showing an example of a position shifting pattern according to the embodiment of the present invention;

DETAILED DESCRIPTION OF THE PREFERRED EMBODIMENTS

Preferred embodiments of the present invention will be described in detail in accordance with the accompanying drawings.

<Arrangement of Apparatus>

Figure 1:
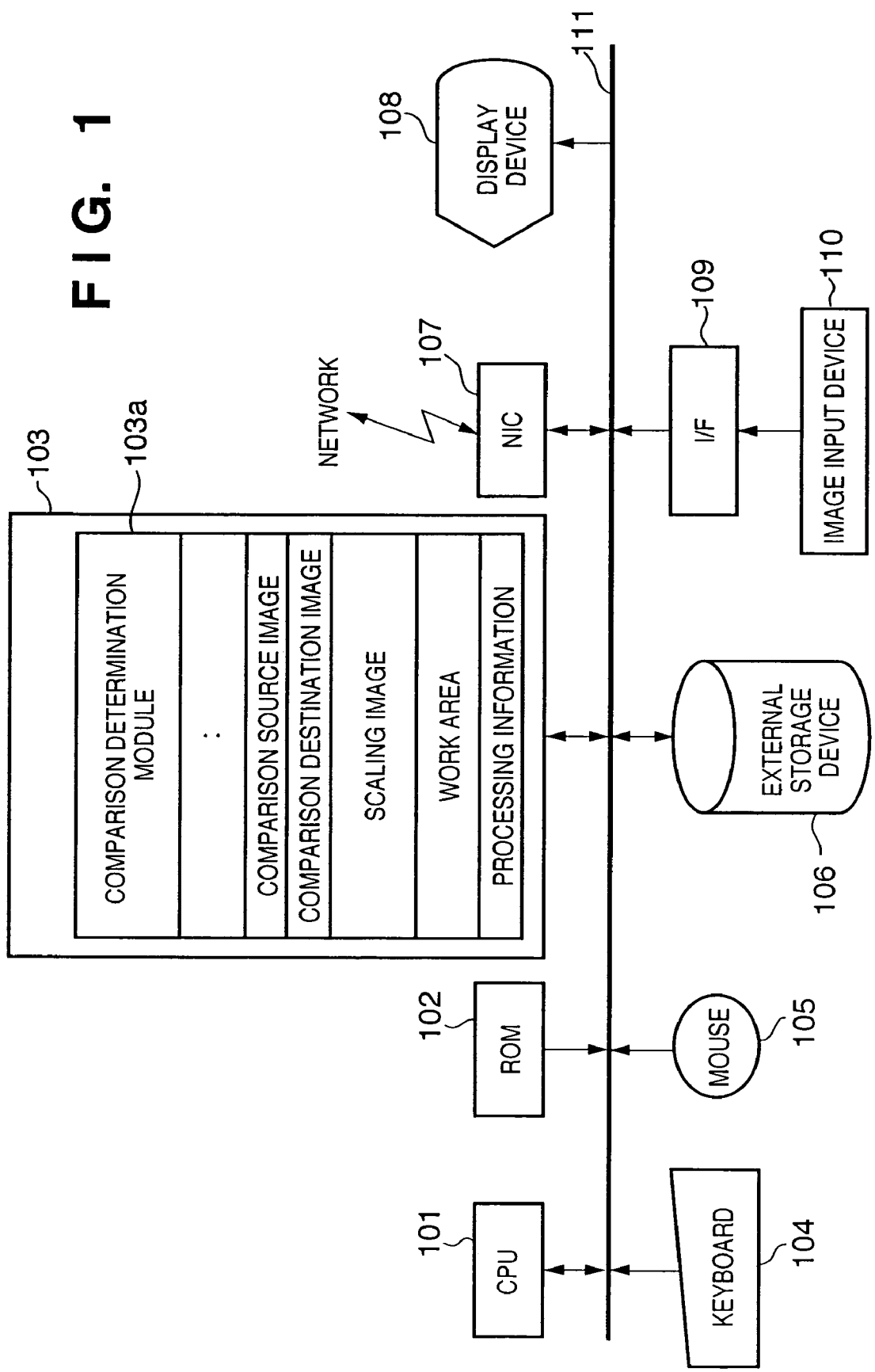
FIG. 1 is a view showing an example of the arrangement of an image processing apparatus according to an embodiment of the present invention.

FIG. 1 is a view showing an example of the arrangement of an image processing apparatus according to an embodiment of the present invention.

In FIG. 1, reference numeral 101 denotes a CPU which executes various arithmetic and control operations in image processing (or image search processing) according to the embodiment. Reference numeral 102 denotes a ROM which stores various permanent data and a boot program executed at startup of the image processing apparatus.

Reference numeral 103 denotes a RAM which stores control programs to be processed by the CPU 101 and provides a work area used to execute various control operations by the CPU 101. For example, the RAM 103 stores, in its storage area, a comparison determination module 103a serving as a program for image processing of the present invention, a comparison source image, a comparison destination image, a scaling image (the scaling image is the image that enlarged/reduced to be same size as an another one), a work area for performing various processes, and processing information on processing (processing parameters, various counter values, thresholds, and the like).

Reference numeral 104 denotes a keyboard; and 105, a mouse which provides various input operation environments for, e.g., designating a processing mode by the user. Reference numeral 106 denotes an external storage device which is formed from a hard disk, flexible disk, CD-ROM, and the like. Reference numeral 107 denotes a NIC (Network Interface Controller) which has a network interface and enables communication with devices on a network.

Reference numeral 108 denotes a display device which is formed from an LCD, CRT, or the like. Reference numeral 109 denotes an interface (I/F) for connecting an external device (e.g., an image input device 110). The image input device 110 is comprised of an image scanner, digital camera, and the like. Reference numeral 111 denotes a bus which interconnects various building components of the image processing apparatus.

A comparison source image and comparison destination image may be stored in an external storage device other than the RAM 103, or acquired from an external device or the image input device 110 on a network.

An outline of processing by the image processing apparatus according to the embodiment will be explained with reference to FIG. 2.

Figure 2:
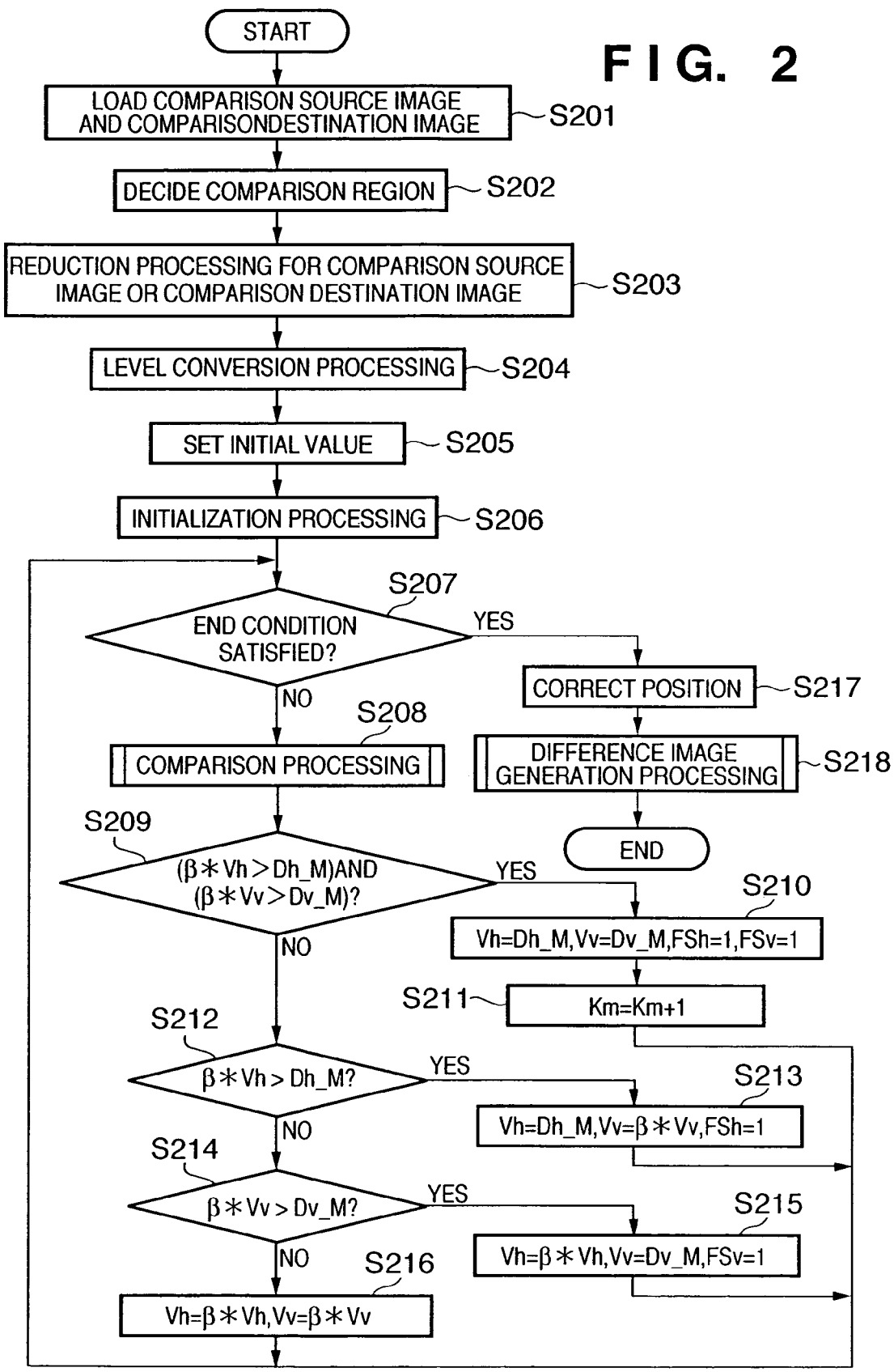
FIG. 2 is a flowchart showing an outline of processing by the image processing apparatus according to the embodiment of the present invention.

FIG. 2 is a flowchart showing an outline of processing by the image processing apparatus according to the embodiment of the present invention.

In step S201, a comparison source image and comparison destination image are loaded from an image input source (e.g., the external storage device 106 or image input device 110) into a memory (e.g., the RAM 103).

In step S202, a comparison source region and comparison destination region are decided as the comparison regions of the comparison source image and the comparison destination image. The comparison region may be decided manually by the user or automatically by the image processing apparatus.

Figure 3:
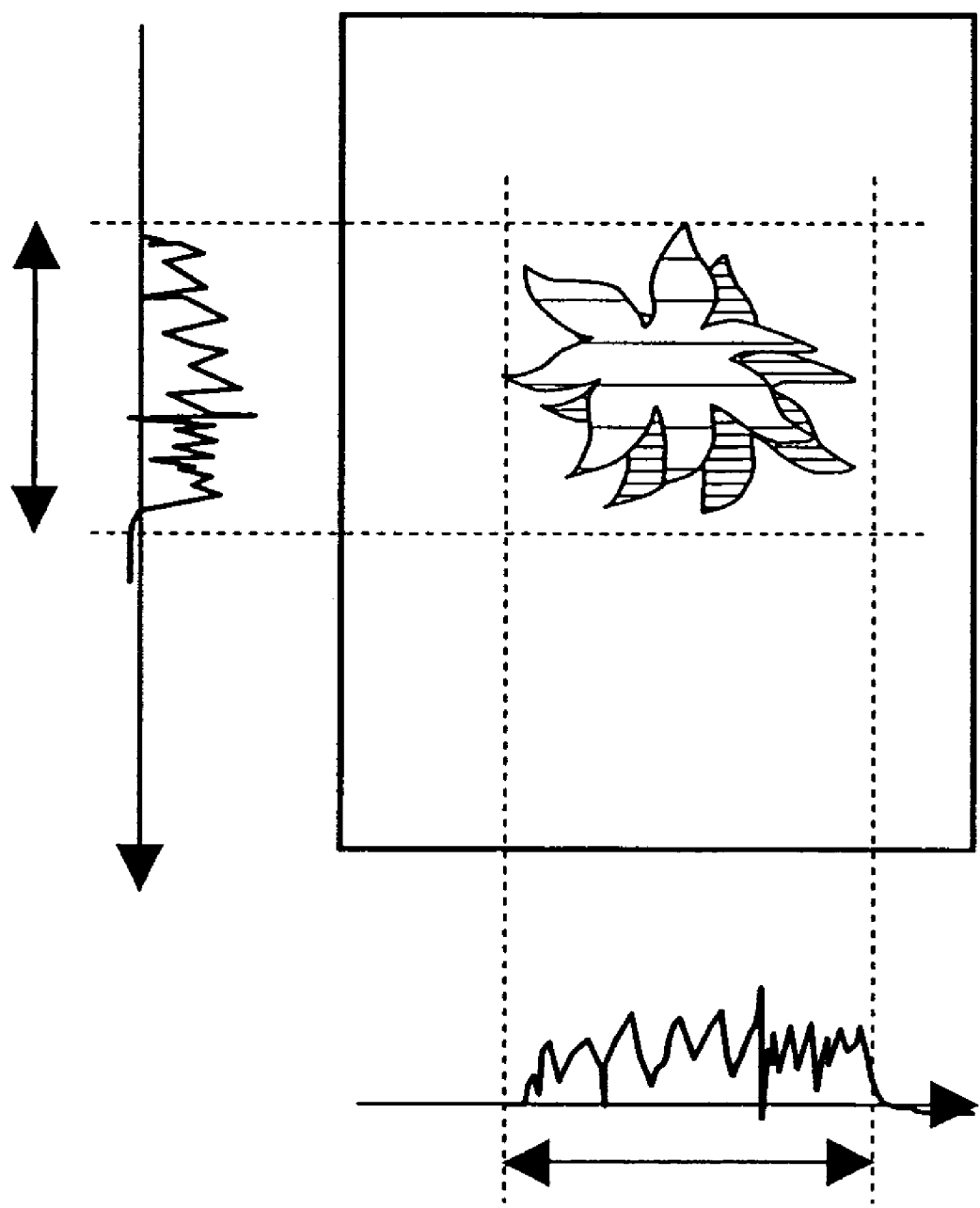
FIG. 3 is a view for explaining a comparison region deciding method according to the embodiment of the present invention.

When the comparison region is automatically decided, histograms are created by projecting the brightness values of the comparison source image and comparison destination image in the horizontal and vertical directions. The circumscribed rectangle of an object to be compared is acquired from the distribution of brightness histograms. This example is illustrated in FIG. 3. The brightness histograms undergo threshold processing, and histogram intervals at which the brightness value is equal to or larger than the threshold are decided in the horizontal and vertical directions, acquiring the circumscribed rectangle of the object. In the embodiment, a rectangular region defined by the circumscribed rectangle is decided as a comparison region (comparison range).

In step S203, the homothetic ratio of the comparison source image and comparison destination image is calculated. If the comparison source image is larger on the basis of the homothetic ratio, it is reduced to generate a new comparison source image. Coordinate information of the comparison region is also corrected in accordance with reduction processing.

If the comparison destination image is larger, it is reduced to generate a new comparison destination image. Coordinate information of the comparison region is also corrected in accordance with reduction processing.

Processing of strictly matching the sizes of the comparison regions of the comparison source image and comparison destination image is very important. This is because in block division of the comparison region (to be described later), the comparison region is divided into blocks for longitudinal and lateral grids. If the size of the comparison region is different between the comparison source image and the comparison destination image, the remainder which remains when the longitudinal and lateral dimensions are divided by a block division count to attain the size of one block changes.

FIG. 4 shows an example of the remainder when the homothetic ratio of the comparison regions of the comparison source image and comparison destination image is 1:2. Since the remainder values of the comparison source image and comparison destination image are different, the remainder cannot be assigned to the blocks of the comparison source image and the comparison destination image under the same condition. This adversely affects the precision of processing of calculating a correction position.

Hence, by reducing the comparison source image and comparison destination image to the same size, the same remainder can be obtained between the comparison destination image and the comparison source image, which can then be treated under the same condition. Further, adverse influence of the remainder upon block division can be avoided.

By reduction processing, the sizes of the comparison regions of the comparison source image and comparison destination image become equal to each other. As for the size of the comparison region, the lateral dimension (number of lateral pixels) is represented by ImgH, and the longitudinal dimension (number of longitudinal pixels) of the comparison region is represented by ImgV.

In step S204, level conversion processing of adjusting the feature amount levels (the numbers of colors and the numbers of gray levels) of the comparison images to the lower feature amount level of the two images is executed.

When both comparison images (comparison source image and comparison destination image) are color images, grayscale images, or binary images, no conversion is done.

When comparison images are a color image and grayscale image, the color image is converted into a grayscale image. If one of the comparison images is a binary image, the other is converted into a binary image.

With this processing, the feature amount levels (number of colors and number of gray levels) of the comparison images can be adjusted to the lower feature amount level of the two images.

In step S205, the initial value of comparison processing is set.

More specifically, an upper limit horizontal block division count Dh_M which is smaller than the lateral pixel count ImgH of the comparison region is set. An upper limit vertical block division count Dv_M which is smaller than the longitudinal pixel count ImgV of the comparison region is set.

Initial block division counts (Vh and Vv) in the horizontal and vertical directions are set to values much smaller than the numbers of lateral and longitudinal pixels of the comparison region. If the initial counts are too small, the count of recursive processing (to be described later) using the initial block division counts increases, and the processing time becomes long. To the contrary, if the initial counts are too large and the position shifting amount does not fall within the range of one block prepared by dividing the comparison region, position shifting correction processing may not converge in principle.

It is, therefore, preferable to predict the precision of the comparison region and set an initial block division count so that an error sufficiently falls within the block size.

A block division count used for the next comparison processing is set by multiplying the current block division count by the second constant $\beta$, and is updated to a position correction value of a higher precision every time processing is repeated. The second constant $\beta$ is set to the range of 1.0 (exclusive) to about 2.0 (maximum), and preferably to 2.0.

As the second constant $\beta$ is smaller, convergence of position correction processing is more assured. In this case, however, the count of recursive processing increases, and processing takes a long time. Thus, a desired value is set in accordance with an application purpose.

In step S206, initialization processing is executed.

More specifically, position correction amounts (Cx and Cy) in the X (lateral) and Y (longitudinal) directions are initialized to 0. A counter Km for comparison processing using the numbers of longitudinal and lateral pixels of the comparison region as longitudinal and lateral block division counts is also initialized to 0. Flags FSh and FSv representing that the block division counts (Vh and Vv) have respectively reached upper limit block division counts (Dh_M and Dv_M) are also initialized to 0.

In step S207, it is determined whether recursive processing end conditions in steps S208 to S216 are satisfied. The end conditions are used to control the recursive processing count, and will be described in detail later. If the end conditions are satisfied (YES in step S207), the flow advances to step S217. If the end conditions are not satisfied (NO in step S207), the flow advances to step S208.

In step S208, the position correction amounts (Cx and Cy) and block division counts (Vh and Vv) are designated, and comparison processing is performed using a plurality of types of block shifting patterns. Based on the result of comparison processing, position correction amounts (Cx and Cy) and a minimum similarity distance Dmin used for the next comparison processing are calculated.

Details of comparison processing in step S208 will be explained with reference to FIG. 5.

Figure 5:
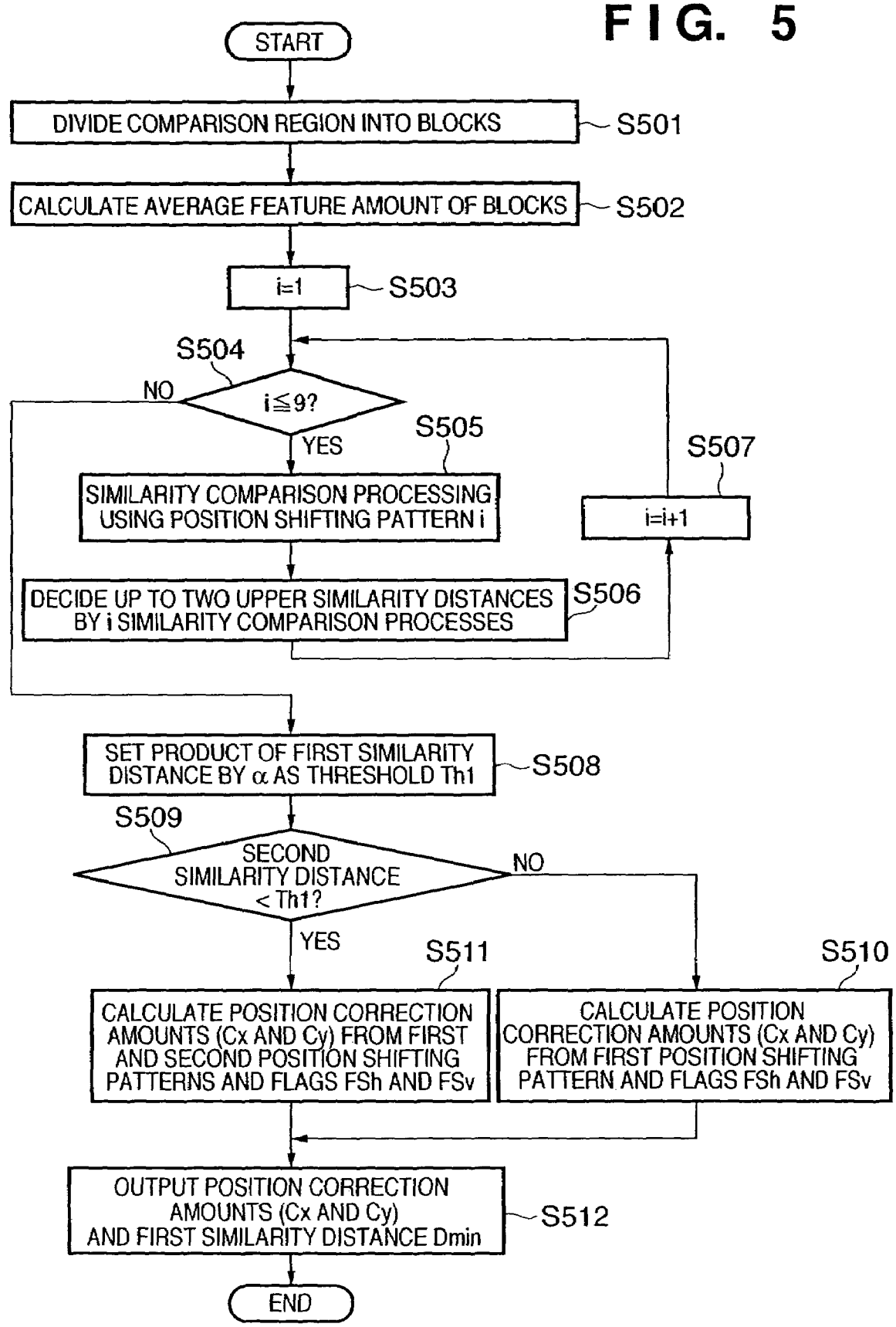
FIG. 5 is a flowchart showing details of comparison processing according to the embodiment of the present invention.

FIG. 5 is a flowchart showing details of comparison processing according to the embodiment of the present invention.

In step S501, the position of the comparison region of a comparison source image is corrected by designated position correction amounts (Cx and Cy), and the comparison region is divided into blocks by designated block division counts (Vh and Vv). The comparison region of a comparison destination image is also divided into blocks by the designated block division counts (Vh and Vv).

An image to which the position correction amounts (Cx and Cy) are applied may be a comparison source image or comparison destination image. The embodiment will exemplify a case wherein the position correction amounts (Cx and Cy) are applied to position correction of a comparison source image.

In step S502, the average feature amount of blocks in the divided comparison region is calculated.

In calculation, when both the comparison images are color images, the average of color channels in each color image is calculated as an average feature amount. When the comparison images are a color image and grayscale image or both of them are grayscale images, the average brightness of each image is calculated as an average feature amount. When one of the comparison images is a binary image, a value which is a majority in each binary block is defined as an average feature amount.

Accordingly, even if the types of two images are different, average feature amounts are calculated for a feature with a smaller information amount of the two images, and compared.

In step S503, a counter i representing a position shifting pattern i is initialized to 1. In step S504, it is determined whether the value of the counter i is equal to or smaller than 9. If the value of the counter i is equal to or smaller than 9 (YES in step S504), the flow advances to step S505. If the value of the counter i is larger than 9 (NO in step S504), the flow advances to step S508.

Step S504 determines whether similarity comparison processing using each of position shifting patterns prepared in advance has been completed. In particular, the embodiment adopts nine position shifting patterns (nine directions), but the present invention is not limited to this and can adopt an arbitrary number of position shifting patterns (e.g., five directions).

An example of the position shifting pattern will be explained with reference to FIG. 6.

FIG. 6 is a view showing an example of the position shifting pattern according to the embodiment of the present invention.

FIG. 6 illustrates nine position shifting patterns. In FIG. 6, position shifting patterns 1 to 9 are selected in accordance with the value of the counter i.

In FIG. 6, a position shifting direction (position correction amount) on each position shifting pattern is given by a unit vector $V(i)=(xi,yi)$. The unit vector originally represents a vector of magnitude 1. In this case, unit vectors $V(6)$ to $V(9)$ of position shifting patterns 6 to 9 are unit vectors ($\sqrt{2}$) which are synthesized using unit vectors $V(2)$ to $V(5)$ of position shifting patterns 2 to 5 and do not have magnitude 1. However, for descriptive convenience, the term "unit vector" will also be used for position shifting patterns 6 to 9.

Figure 7:
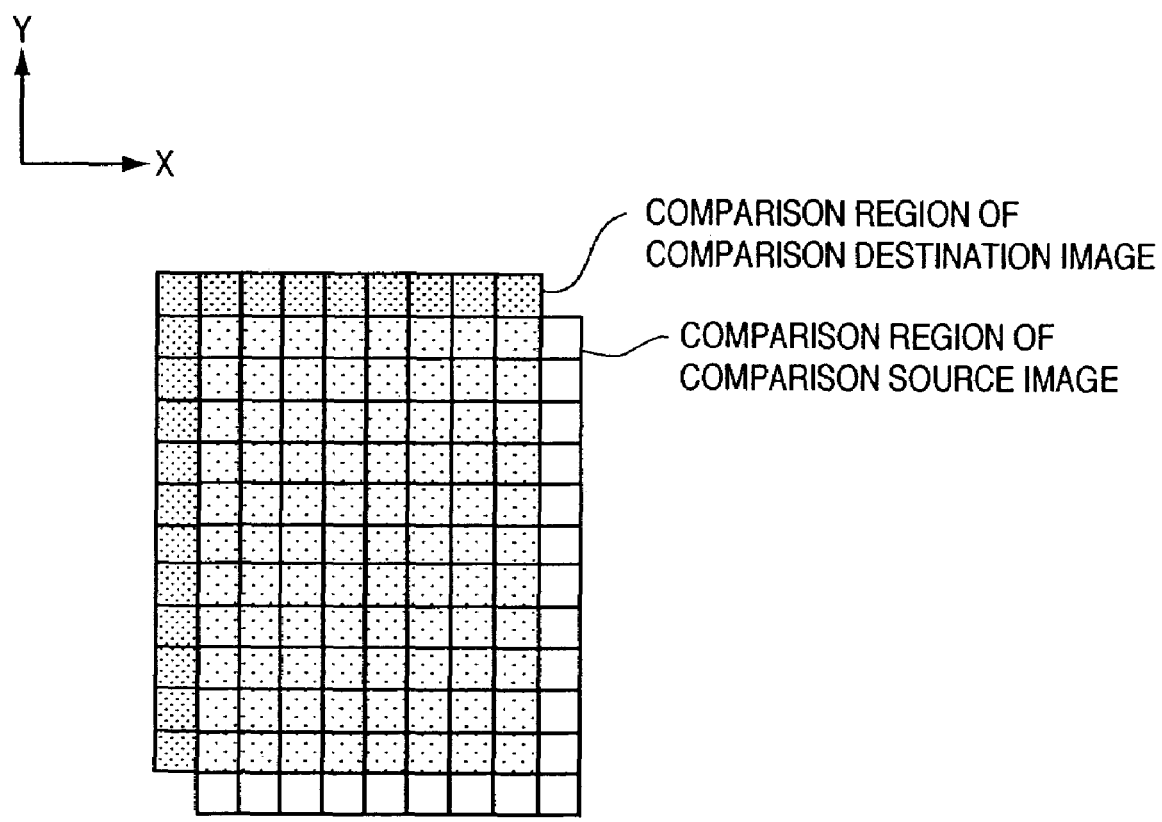
FIG. 7 is a view showing an example of position shifting according to the embodiment of the present invention.

In FIG. 6, for example, position shifting pattern 1 has a position correction amount $V(1)=(0,0)$. That is, no substantial position shifting occurs in the X and Y directions. For example, position shifting pattern 9 has a position correction amount $V(9)=(1,-1)$. In this case, the position of the comparison region is shifted by "1" in the X direction and "−1" in the Y direction. More specifically, the position of the comparison region of a comparison source image is shifted, as shown in FIG. 7.

Referring back to FIG. 5, in step S505, similarity comparison processing is performed using the position shifting pattern i to be processed.

More specifically, the absolute value of the difference in feature amount between the overlapping portions of the comparison source image and comparison destination image after position shifting of the comparison region of the comparison source image on the basis of the position shifting pattern i is calculated for each block, and the absolute values of the differences of blocks are added.

The sum is divided by the number of blocks at the overlapping portion, and an average difference Diff(i) per block is calculated as a similarity distance (similarity). Two upper smallest similarity distances (similarities), i.e., two upper smallest average differences Diff(i) per block in i similarity comparison processes are decided. The similarity distance represents the average difference Diff(i), and the similarity is higher as the similarity distance is smaller. In other words, the smallest similarity distance corresponds to the highest similarity.

In step S507, the counter i is incremented by one, and the flow returns to step S504 in order to select the next position shifting pattern. In step S504, if the value of the counter i is larger than 9 (NO in step S504), i.e., all the position shifting patterns have been selected and similarity comparison processing using each position shifting pattern has ended, the flow advances to step S508.

In step S508, the smallest (first) similarity distance among similarity distances decided by processing in step S506 is multiplied by the first constant $\alpha$. The product is set as a threshold TH1 for determining whether to enable a position shifting pattern corresponding to the second similarity distance.

From the experiments conducted by the present inventor, the constant $\alpha$ is preferably about 1.2.

In step S509, it is determined whether the second similarity distance is smaller than the threshold TH1. If the second similarity distance is equal to or larger than the threshold TH1 (NO in step S509), the position correction amounts (Cx and Cy) are calculated in step S510 from flags FSh and FSv and the first position shifting pattern p1 corresponding to the smallest (first) similarity distance.

The position correction amounts (Cx and Cy) are calculated by

If (FSh≠1)

$$Cx=ImgH/Vh*V(p1,x)$$

Else $$Cx=V(p1,x)$$

If (FSv≠1)

$$Cy=ImgV/Vv*V(p1,y)$$

Else $$Cy=V(p1,y) \quad (1)$$

V(i,x): the x component of the unit vector V(i) of the position shifting pattern i V(i,y): the y component of the unit vector V(i) of the position shifting pattern i In conditional expression (1), the term ImgH/Vh means the lateral dimension (number of lateral pixels) of a divided block, and the term ImgV/Vv means the longitudinal dimension (number of longitudinal pixels) of the divided block. When the flags FSh and FSv are set (FSh=1 and FSv=1), both the horizontal and vertical block division counts have reached their upper limit block division counts. Hence, the horizontal and vertical components of the unit vector are kept used.

If the second similarity distance is smaller than the threshold TH1 in step S509 (YES in step S509), the position correction amounts (Cx and Cy) are calculated in step S511 from the flags FSh and FSv, the first position shifting pattern p1 corresponding to the smallest (first) similarity distance, and the second position shifting pattern p2 corresponding to the second smallest (second) similarity distance.

The position correction amounts (Cx and Cy) are calculated by

If (FSh≠1)

$Cx=ImgH/Vh*(V(p1,x)+V(p2,x))/2$

Else $Cx=(V(p1,x)+V(p2,x))/2$

If (FSv≠1)

$Cy=ImgV/Vv*(V(p1,y)+V(p2,y))/2$

Else $Cy=(V(p1,y)+V(p2,y))/2$ (2)

V(i,x): the x component of the unit vector+V(i) of the position shifting pattern i V(i,y): the y component of the unit vector V(i) of the position shifting pattern i In conditional expression (2), the term ImgH/Vh means the lateral dimension (number of lateral pixels) of a divided block, and the term ImgV/Vv means the longitudinal dimension (number of longitudinal pixels) of the divided block. Also in conditional expression (2), the terms (V(p1,x)+V(p2,x))/2 and (V(p1,y)+V(p2,y))/2 mean the average vectors of the unit vectors of two position shifting patterns, respectively. When the flags FSh and FSv are set, both the horizontal and vertical block division counts have reached their upper limit block division counts. The horizontal and vertical components of the unit vector are, therefore, kept used.

Figure 8:
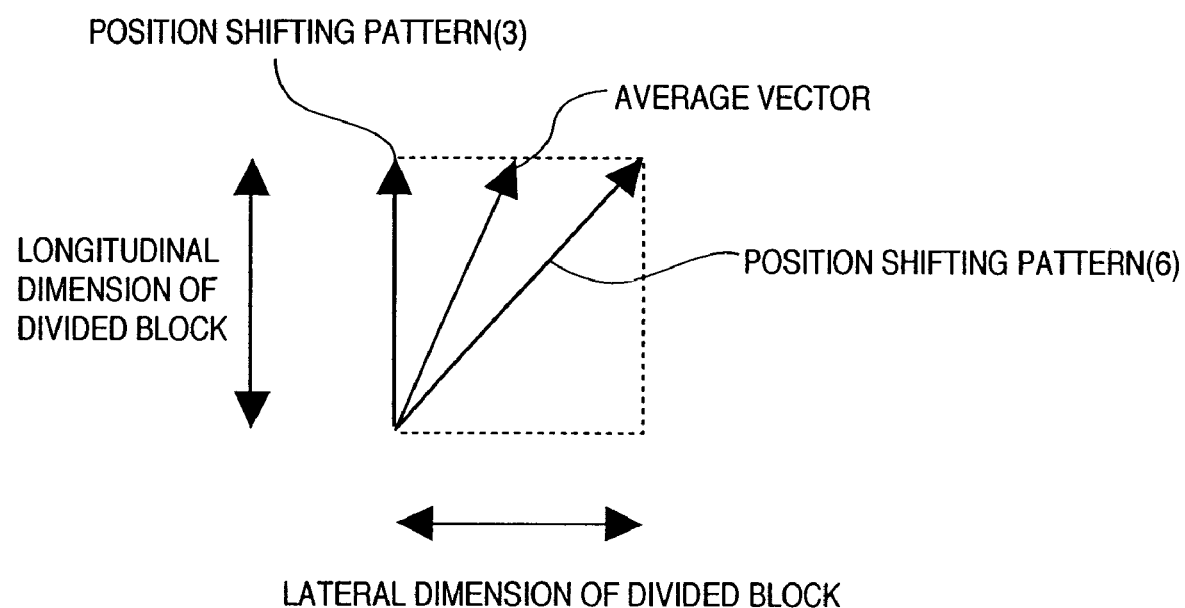
FIG. 8 is a view for explaining a position correction amount calculation method according to the embodiment of the present invention.

Letting V(3) be the first position shifting pattern and V(6) be the second position shifting pattern, the average vector is represented as shown in FIG. 8.

Figure 9:
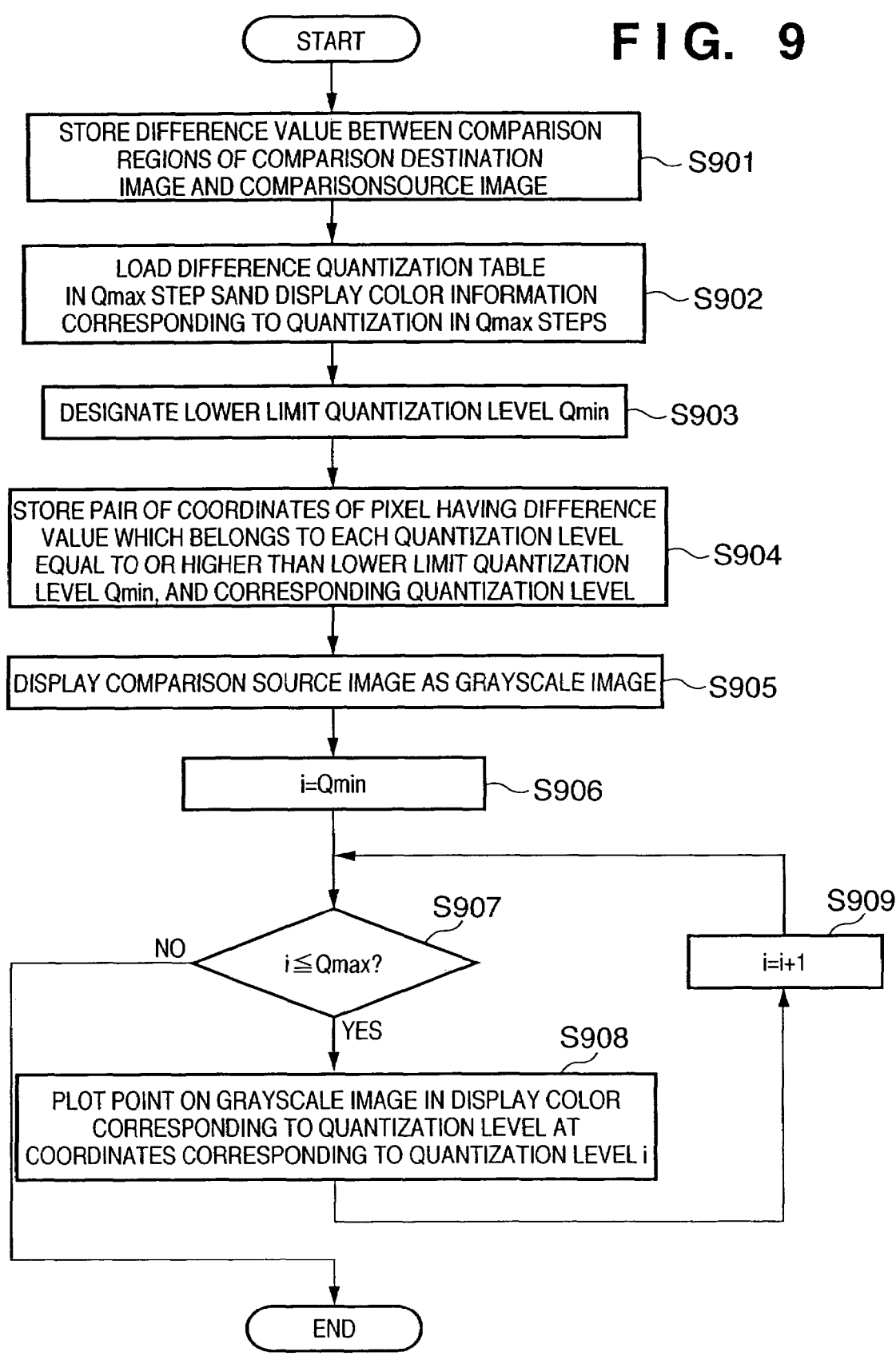
FIG. 9 is a flowchart showing details of difference image generation processing according to the embodiment of the present invention.

Assume that five position shifting patterns are used, and a position shift corresponding to the diagonal component of a block is to be corrected, like position shifting pattern 6. In this case, if horizontal position shifting pattern 2 and vertical position shifting pattern 3 are averaged, the average value becomes ½ of the magnitude of position shifting pattern 6 though the direction coincides with the vector of position shifting pattern 6. Thus, the upper limit of the position correction amount decreases. To prevent this, nine position shifting patterns are preferably used as shown in FIG. 9.

In step S512, the position correction amounts (Cx and Cy) and the first similarity distance Dmin are output.

Referring back to FIG. 2, after the end of comparison processing in step S208, a series of processes of multiplying the current block division count by β to calculate a block division count for the next recursive processing are executed in steps S209 to S216.

In step S209, it is determined whether both the products of the current horizontal and vertical block division counts (Vh and Vv) multiplied by β have exceeded upper limit block division counts (Dh_M and Dv_M). If these products have exceeded the upper limit block division counts (Dh_M and Dv_M) (YES in step S209), the flow advances to step S210. In step S210, the horizontal and vertical block division counts (Vh and Vv) are set as the upper limit block division counts (Dh_M and Dv_M). Further, the flags FSh and FSv representing that the block division counts (Vh and Vv) have reached the upper limit block division counts (Dh_M and Dv_M) are set to 1. In step S211, the counter Km for performing processing using the block division counts as the upper limit block division counts is incremented by one, and the flow returns to step S207.

If both the products of the current horizontal and vertical block division counts (Vh and Vv) multiplied by β do not exceed the upper limit block division counts (Dh_M and Dv_M) in step S209 (NO in step S209), the flow advances to step S212. In step S212, it is determined whether the product of the current horizontal block division count Vh by β has exceeded the upper limit horizontal block division count Dh_M.

If the product has exceeded the upper limit horizontal block division count Dh_M (YES in step S212), the flow advances to step S213. In step S213, the horizontal block division count Vh is set as the upper limit horizontal block division count Dh_M. The product of the current vertical block division count Vv multiplied by β is set as a new vertical block division count Vv. In addition, the flag FSh is set to 1, and then the flow returns to step S207.

If the product of the current horizontal block division count Vh by β does not exceed the upper limit horizontal block division count Dh_M (NO in step S212), the flow advances to step S214. In step S214, it is determined whether the product of the current vertical block division count Vv by β has exceeded the upper limit vertical block division count Dv_M. If the product has exceeded the upper limit vertical block division count Dv_M (YES in step S214), the flow advances to step S215. In step S215, the vertical block division count Vv is set as the upper limit vertical block division count Dv_M. The product of the current horizontal block division count Vh multiplied by P is set as a new horizontal block division count Vh. In addition, the flag FSv is set to 1, and then the flow returns to step S207.

If the product of the current vertical block division count Vv by β does not exceed the upper limit vertical block division count Dv_M (NO in step S214), the flow advances to step S216. In step S216, the products of the current horizontal and vertical block division counts (Vh and Vv) multiplied by β are set as new block division counts (Vh and Vv) for the next recursive processing. After that, the flow returns to step S207.

In step S207, it is determined whether the end condition of recursive processing is satisfied. If the end condition is not satisfied (NO in step S207), recursive processing from step S208 is executed under a new end condition. If the end condition is satisfied (YES in step S207), the latest position correction amounts (Cx and Cy) are reflected in the comparison region of the comparison source image, and position correction for the comparison region of the comparison source image is executed in step S217. As a result, final position correction ends.

In step S218, difference image generation processing is executed. An obtained difference image is displayed on, e.g., the display device 108.

In difference image generation processing, difference information (difference image) in the comparison region between a pair of comparison images having optimally undergone position correction is acquired. In the acquired difference image, the positions of pixels whose pixel values are equal to or larger than a predetermined threshold are stored. If the comparison source image is a color image, it is converted into a grayscale image. Pixels whose pixel values are equal to or larger than the threshold are overlaid and displayed in a predetermined color (e.g., prominent color such as red) on the grayscale image.

Details of difference image generation processing in step S218 will be explained with reference to FIG. 9.

FIG. 9 is a flowchart showing details of difference image generation processing according to the embodiment of the present invention.

In step S901, the difference value of a pixel value in the comparison region of a comparison source image is calculated from a corresponding pixel value in the comparison region of a comparison destination image. Only positive difference values are paired with coordinates in the comparison region of the comparison destination image, and the pairs are stored in a memory.

The reason why only an image of a positive value is used is to display a comparison source image serving as a reference image in the grayscale, and highlight and display, on the grayscale image, defective pixels which exist in a comparison destination image but do not exist in the reference image.

In step S902, a difference quantization table for quantizing a difference value in Qmax steps, and display color information (setting) of a pixel that belongs to each quantization step are loaded.

The difference quantization table is different between generation of a difference image using color information and generation of a difference image using grayscale information. For this reason, the difference quantization table is switched to one appropriate for an image to be processed, and the switched table is loaded.

As for the display color information, in order to avoid confusion, when there are, e.g., three quantization steps, colors which have different hues and can be easily identified are selected:

(R, G, B)=(255,0,0), (0,255,0), (0,0,255)

With this setting, a difference corresponding to a difference value can be expressed by color such that the color is blue for a small error, green for a slightly large error, and red for a very large error.

In step S903, a lower limit quantization level Qmin used for display is designated. If the lower limit quantization level Qmin is set to Qmax, only a pixel having a very large difference value is displayed in a predetermined color (e.g., red).

In step S904, the coordinates of a pixel having a difference value which belongs to each quantization level equal to or higher than the lower limit quantization level Qmin are paired with the quantization level, and the pair is stored. In step S905, the comparison source image is displayed as a grayscale image.

In step S906, the quantization step i in process is initialized to Qmin. In step S907, it is determined whether the quantization step i is equal to or smaller than the maximum amount (quantization step Qmax).

If the quantization step i is equal to or smaller than the maximum amount (quantization step Qmax) (YES in step S907), the flow advances to step S908. In step S908, a point is plotted at a coordinate position corresponding to the quantization level i on the grayscale image in a display color corresponding to the quantization level. In step S909, the quantization level i is incremented by one to the next quantization level.

If the quantization step i is larger than the maximum amount (quantization step Qmax) (NO in step S907), i.e., processing at all the quantization steps i has ended, the processing ends.

By processing in FIG. 9, the difference of a comparison destination image from a comparison source image serving as a reference can be easily visually recognized in an intuitively easy-to-understand color corresponding to the difference after accurate alignment.

End condition determination processing in step S207 can be achieved by various methods. Several examples of determination processing will be explained.

Figure 10:
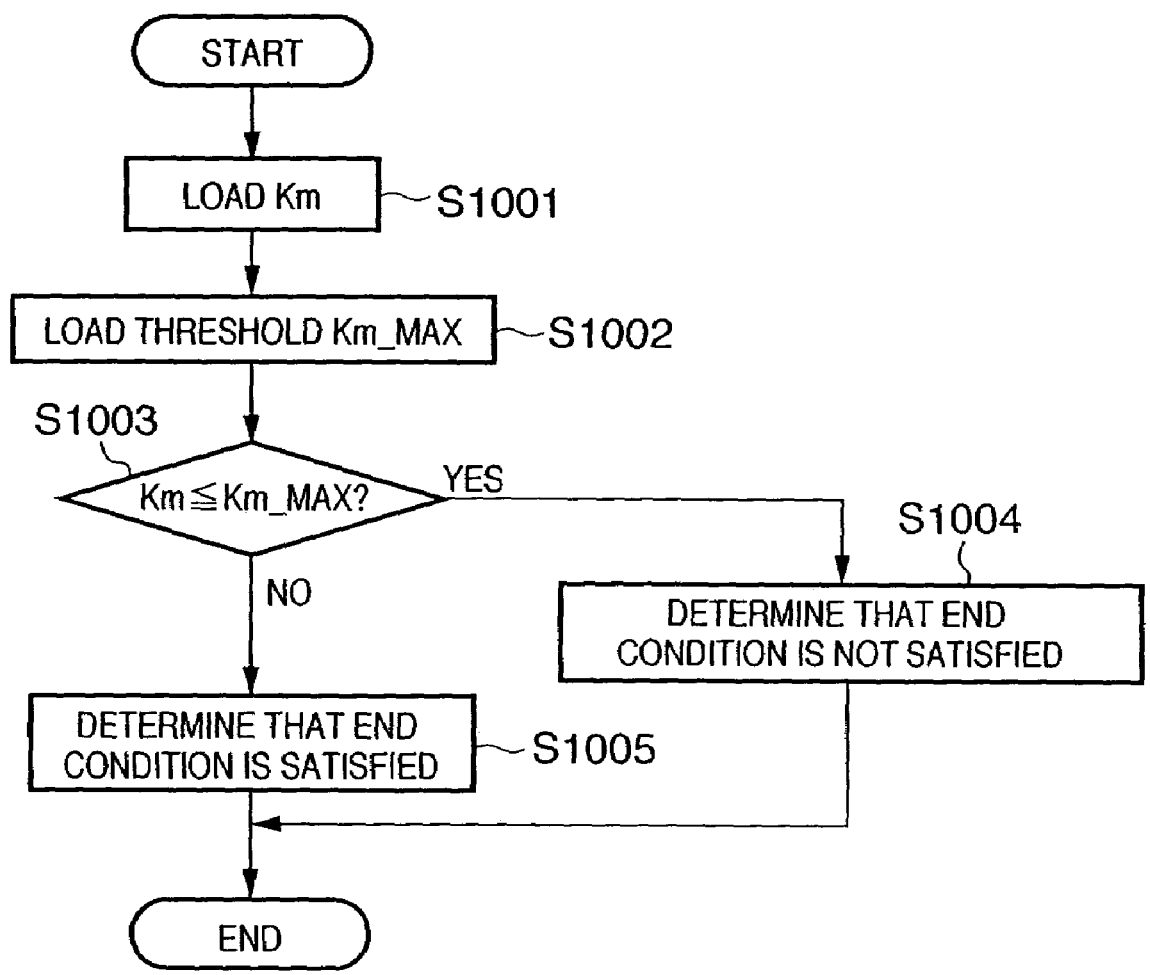
FIG. 10 is a flowchart showing an example of details of determination processing according to the embodiment of the present invention.

FIG. 10 is a flowchart showing an example of details of determination processing according to the embodiment of the present invention.

In step S1001, the value of the counter Km for performing processing using the block division count as the size of the comparison region is loaded. In step S1002, a limit count threshold Km_MAX for performing processing using the block division count as the size of the comparison region is loaded.

In step S1003, it is determined whether Km is equal to or smaller than Km_MAX. If Km is equal to or smaller than Km_MAX (YES in step S1003), it is determined in step S1004 that the end condition is not satisfied. If Km is larger than Km_MAX (NO in step S1003), it is determined in step S1005 that the end condition is satisfied.

By the above processing, even when position correction processing does not converge near a correct value at Km=0, comparison processing (FIG. 5) between a comparison source image and a comparison destination image (a comparison source region and a comparison destination region) using the block division count as the size of the comparison region can be so controlled as to be recursively repeated until Km reaches a certain value while the comparison position is slightly adjusted (corrected). Since the position of one pixel in one block can be slightly corrected several times in nine directions for each pixel at Km>0, position correction can be compensated to achieve convergence to a correct position correction amount.

An application to processing in FIG. 10 will be explained with reference to FIG. 11. Processing in FIG. 11 can further increase the efficiency of processing in FIG. 10.

Figure 11:
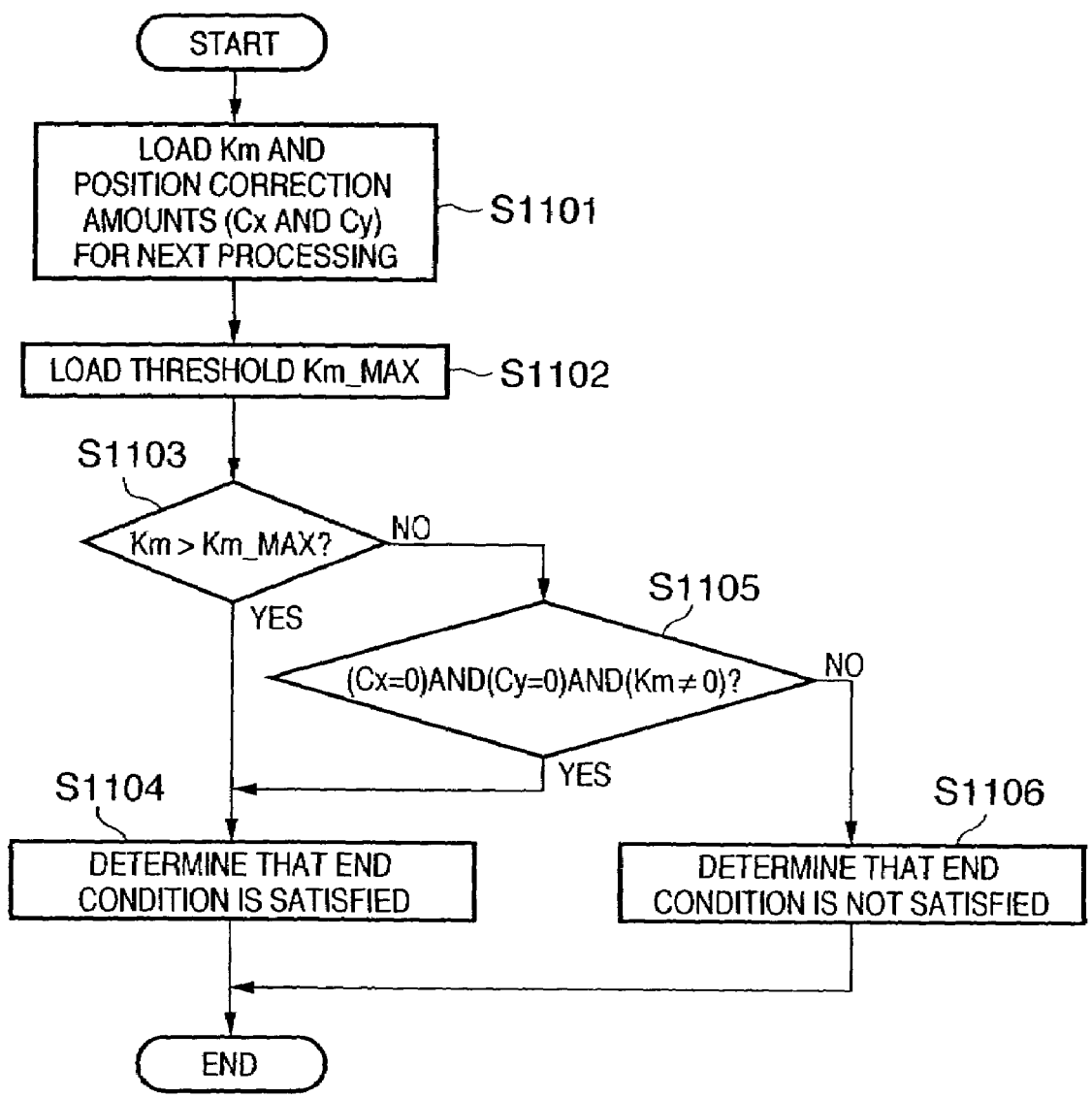
FIG. 11 is a flowchart showing another example of details of determination processing according to the embodiment of the present invention.

FIG. 11 is a flowchart showing another example of details of determination processing according to the embodiment of the present invention.

In step S111, Km and the position correction amounts (Cx and Cy) for the next processing are loaded. In step S1102, the limit count threshold Km_MAX for performing processing using the block division count as the size of the comparison region is loaded.

In step S1103, it is determined whether Km is larger than Km_MAX. If Km is larger than Km_MAX (YES in step S1103), it is determined in step S1104 that the end condition is satisfied. If Km is equal to or smaller than Km_MAX (NO in step S1103), the flow advances to step S1105. In step S1105, it is determined whether both the horizontal and vertical position correction amounts (Cx and Cy) are 0 and Km is not 0 (the flow has come to processing using the block division count as the size of the comparison region).

If both the horizontal and vertical position correction amounts (Cx and Cy) are 0 (YES in step S1105), it is determined in step S1104 that the end condition is satisfied. If both the horizontal and vertical position correction amounts (Cx and Cy) are not 0 (NO in step S1105), it is determined in step S1106 that the end condition is not satisfied.

It is obvious in principle that once both the horizontal and vertical position correction amounts (Cx and Cy) become 0, they remain 0. Based on this property, processing is interrupted in FIG. 11.

Figure 12:
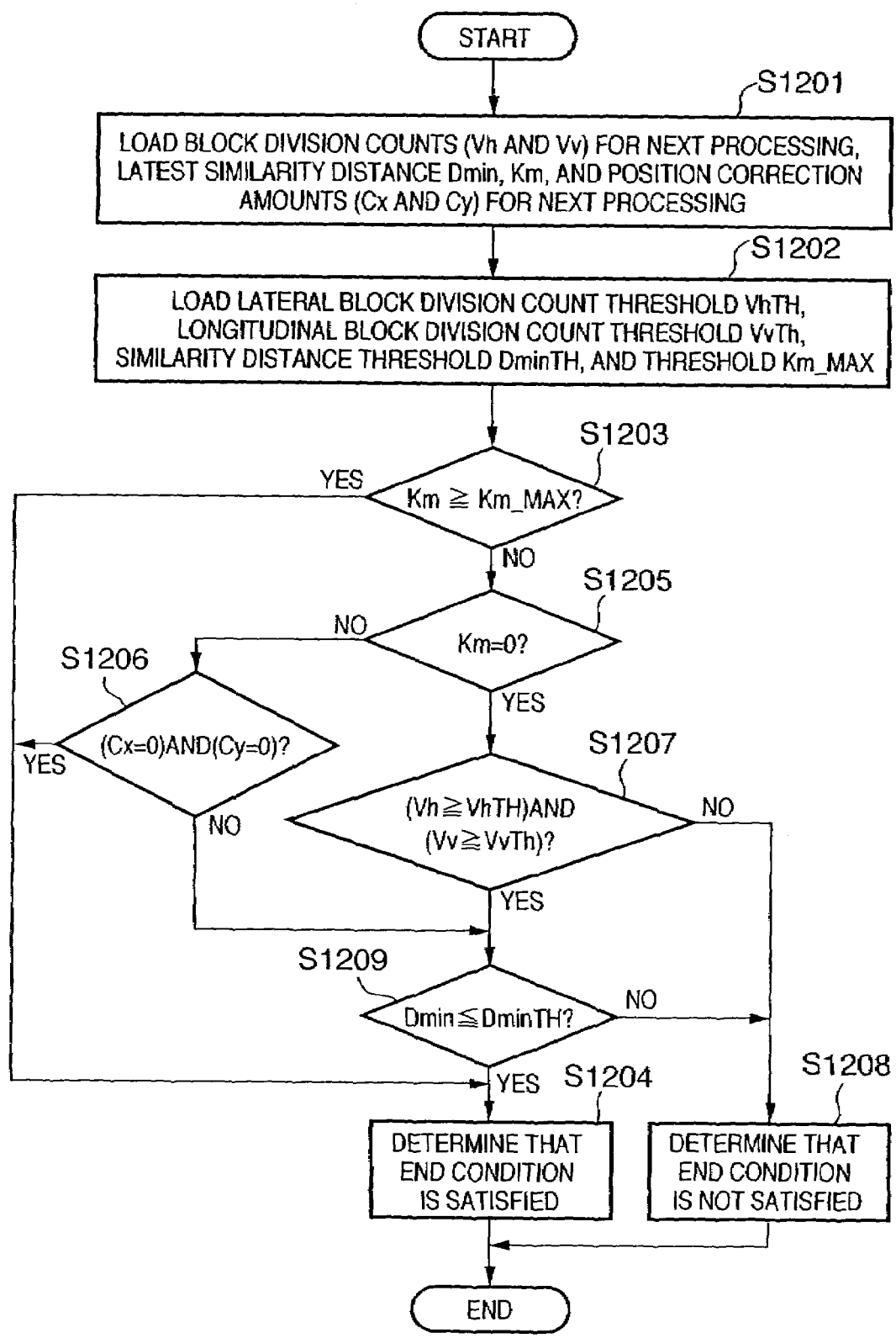
FIG. 12 is a flowchart showing still another example of details of determination processing according to the embodiment of the present invention.

A further application to processing in FIG. 11 will be described with reference to FIG. 12. In FIG. 12, processing of ending recursive processing when the block division count has reached a predetermined one and the minimum similarity distance is equal to or smaller than a predetermined threshold even before the flow comes to processing using the block division count as the size of the comparison region is added to processing in FIG. 11.

FIG. 12 is a flowchart showing still another example of details of determination processing according to the embodiment of the present invention.

In step S1201, Km and the position correction amounts (Cx and Cy) for the next processing are loaded. Further, the block division counts (Vh and Vv) for the next processing and the latest similarity distance Dmin are loaded. In step S1202, a minimum lateral block division count threshold VhTH and minimum longitudinal block division count threshold VvTH capable of stopping processing, and a similarity distance threshold DminTH for permitting the stop of processing are loaded. Also, the limit count threshold Km_MAX for performing processing using the block division count as the size of the comparison region is loaded.

In step S1203, it is determined whether Km is larger than Km_MAX. If Km is larger than Km_MAX (YES in step S1203), it is determined in step S1204 that the end condition is satisfied. If Km is equal to or smaller than Km_MAX (NO in step S1203), whether Km=0 is determined in step S1205.

If Km≠0 (NO in step S1205), it is determined in step S1206 whether both the horizontal and vertical position correction amounts (Cx and Cy) are 0. If both the horizontal and vertical position correction amounts (Cx and Cy) are 0 (YES in step S1206), it is determined in step S1204 that the end condition is satisfied. If both the horizontal and vertical position correction amounts (Cx and Cy) are not 0 (NO in step S1206), it is determined in step S1209 whether the latest similarity distance Dmin is equal to or smaller than the similarity distance threshold DminTH.

If the similarity distance Dmin is equal to or smaller than the similarity distance threshold DminTH (YES in step S1209), it is determined in step S1204 that the end condition is satisfied. If the similarity distance Dmin is larger than the similarity distance threshold DminTH (NO in step S1209), it is determined that the end condition is not satisfied.

If Km=0 in step S1205 (YES in step S1205), the flow advances to step S1207. In step S1207, it is determined whether both the horizontal and vertical block division counts (Vh and Vv) are respectively equal to or larger than the minimum lateral block division count threshold VhTH and minimum longitudinal block division count threshold VvTH capable of stopping processing.

If both the horizontal and vertical block division counts (Vh and Vv) are respectively smaller than the lateral block division count threshold VhTH and longitudinal block division count threshold VvTH (NO in step S1207), it is determined in step S1208 that the end condition is not satisfied. If both the horizontal and vertical block division counts (Vh and Vv) are respectively equal to or larger than the lateral block division count threshold VhTH and longitudinal block division count threshold VvTH (YES in step S1207), the flow advances to step S1209.

In the prior art, position shifting matching is executed at a low resolution, and the position shifting range at the next resolution is limited in accordance with the degree and continuity of matching, realizing both high speed and high precision.

To the contrary, the above-described embodiment can realize position shifting correction at high precision. Especially in the embodiment, the analysis resolution is sequentially increased without performing excessive position shifting matching at one resolution/layer in the comparison region, and more accurate position shifting correction is performed at the next higher analysis resolution (by correcting the previous resolution). In addition, the value of the position shifting correction value (position correction amount) is decreased in inverse proportion to the resolution. The position shifting correction value can be converged while the resolution is increased. Compared to the prior art, the embodiment can realize both high-precision position shifting correction and high speed.

A characteristic arrangement of the embodiment will be summarized as follows.

Two images are input as comparison images. The comparison regions (comparison source region and comparison destination region) of the two comparison images are decided. Each comparison region is divided into a plurality of blocks by designated block division counts (horizontal (lateral) and vertical (longitudinal) block division counts). The feature amount of the comparison region is calculated for each block. In similarity comparison between the comparison regions, the similarity distance between the comparison source region and the comparison destination region after the position of the comparison source image is shifted using a plurality of types of position shifting patterns for shifting the position of the comparison source image is calculated on the basis of the calculated feature amount.

A position correction amount for correcting the position of the comparison source region for the next similarity comparison is calculated on the basis of the size of a divided block and a position shifting pattern corresponding to the smallest similarity distance (or this position shifting pattern and a position shifting pattern corresponding to the second smallest cumulative distance which falls within a threshold obtained from the smallest cumulative distance) among calculated similarity distances.

Every time the position correction amount is calculated, a block division count larger than a block division count in previous similarity comparison is designated, and recursive processing of recursively executing the above processing is executed. In addition, every time the position correction amount is calculated, it is determined whether to end recursive processing. If recursive processing is determined to be ended, a position correction amount at this time is finalized as a final position correction amount of the comparison source region.

After the position of the comparison source region is corrected by an optimal position correction amount, the comparison source region can be compared with the comparison destination region. Accordingly, difference information (e.g., difference image) between the comparison source region and the comparison destination region can be generated.

When the comparison source region and comparison destination region are different in size, equalization processing of making comparison regions the same (equal) before block division is preferably performed in terms of the property of block division. In equalization processing, the homothetic ratio of the comparison source image and comparison destination image is calculated, and at least one of the comparison source region and comparison destination region is scaled (enlarged/reduced) on the basis of the calculated homothetic ratio so as to make the sizes of the comparison source region and comparison destination region equal to each other. By performing similarity comparison using the comparison source region and comparison destination region after scaling, strict similarity comparison can be achieved.

When the feature amount level such as the number of colors or the number of gray levels is different between comparison regions, similarity comparison is preferably performed at the same feature amount level. For this reason, when the feature amount level is different between comparison regions and the comparison regions are a color image and grayscale image, the color image is converted into a grayscale image, and the grayscale image is stored as a feature amount calculation image at a stage prior to calculation of the feature amount. If at least one of the comparison regions is a binary image, the other is converted into a binary image, and the binary image is stored as a feature amount calculation image. Calculation of the feature amount of the comparison region uses the stored block feature amount calculation image.

In order to increase the speed of alignment processing between comparison regions, when both the comparison regions are color images, they may be converted into grayscale images, and the grayscale images may be stored as feature amount calculation images, in addition to the above processing.

In calculating the feature amount of each block, when both the comparison regions are color images, the average of color channels of each color image is defined as a feature amount. When the comparison regions are a color image and grayscale image or both of them are grayscale images, an average brightness is defined as an average feature amount. When at least one of the comparison regions is a binary image, a value which is a majority of each binary block is defined as a feature amount. This arrangement can absorb the difference in feature amount level between comparison regions.

In generating difference information between comparison regions, when both the comparison regions are color images, difference information in the color information is generated. If both the comparison regions are grayscale images, or one of the comparison regions is a color image and the other is a grayscale image, difference information in the grayscale information is generated. When at least one of the comparison regions is a binary image, difference information in the binary information is generated.

When equalization processing for the sizes of comparison regions is executed, difference information is generated from the comparison regions after equalization processing.

In calculating a similarity distance, position shifting directions for each block that are defined by position shifting patterns are at least a total of five directions: two horizontal directions, two vertical directions, and one fixed direction. In order to assure convergence of processing of accurately performing fine position correction while increasing the block division count in recursive processing, a total of nine directions: two horizontal directions, two vertical directions, four oblique directions, and one fixed direction are preferably employed.

In increasing the block division count, the longitudinal block division count is increased, and saturation processing of limiting an increase in longitudinal block division count so as not to exceed a predetermined upper limit longitudinal block division count is performed. Similarly, the lateral block division count is increased, and saturation processing of limiting an increase in lateral block division count so as not to exceed a predetermined upper limit lateral block division count is performed. When the increased longitudinal and lateral block division counts do not exceed the upper limit longitudinal and lateral block division counts, no saturation processing is done, and these block division counts are increased and updated as block division counts to be newly applied to comparison regions.

In calculating a position correction amount, when there is a position shifting direction corresponding to the second smallest cumulative distance which falls within the product of the smallest similarity distance multiplied by the first constant, a direction vector as the average between the position shifting direction corresponding to the second smallest cumulative distance and a position shifting direction corresponding to the smallest similarity distance is acquired. When there is no position shifting direction corresponding to the second smallest cumulative distance which falls within the product of the smallest similarity distance multiplied by the first constant, the direction vector of the smallest similarity distance is acquired.

When the longitudinal block division count is increased and reaches a predetermined upper limit longitudinal block division count, and saturation processing is performed, the longitudinal component of the correction direction vector serving as a position correction amount is set to the value of the longitudinal component of the acquired direction vector. The lateral component of the correction direction vector is set to the product of the lateral component of the acquired direction vector multiplied by the lateral block division count.

When the lateral block division count is increased and reaches a predetermined upper limit lateral block division count, and saturation processing is performed, the lateral component of the correction direction vector serving as a position correction amount is set to the value of the lateral component of the acquired direction vector. The longitudinal component of the correction direction vector is set to the product of the longitudinal component of the acquired direction vector multiplied by the longitudinal block division count.

When the longitudinal and lateral block division counts are increased and reach their upper limit longitudinal and lateral block division counts, and no saturation processing is performed, the longitudinal and lateral components of the correction direction vector serving as a position correction amount are set to the products of the longitudinal and lateral component of the acquired direction vector multiplied by the longitudinal and lateral block division counts.

One of end conditions for recursive processing is that recursive processing has been executed a predetermined number of times while the longitudinal and lateral block division counts have reached predetermined upper limit longitudinal and lateral block division counts, as shown in FIG. 10. However, the present invention is not limited to this method. For example, as shown in FIG. 11, if the position correction amount changes to 0 while recursive processing is repeated a predetermined number of times, position correction has been converged, and thus recursive processing may be ended. Alternatively, as shown in FIG. 12, recursive processing may be ended when the longitudinal and lateral block division counts have reached predetermined upper limit longitudinal and lateral block division counts and the similarity distance at this time becomes smaller than a predetermined threshold.

The upper limit longitudinal and lateral block division counts generally suffice to be the longitudinal and lateral dimensions of each comparison region, but are not limited to them. For example, if image degradation or the like occurs, block division counts for a block of two pixels x two pixels may be designated as integral fractions of the longitudinal and lateral dimensions to obtain a smoothing effect.

Block division counts for the next similarity comparison can be easily designated by multiplying current block division counts by a constant. The constant is larger than 1.0 and is desirably about 2.0, and its upper limit is smaller than 3.0 at maximum. This is because position correction processing hardly converges for an excessively large constant.

In generating difference information, when both the comparison regions are color images after equalization processing for the sizes of the comparison regions, difference information in the color information is generated. If both the comparison regions are grayscale images, or one of the comparison regions is a color image and the other is a grayscale image, difference information in the grayscale information is generated. When at least one of the comparison regions is a binary image, difference information in the binary information is generated.

The difference information is, e.g., a pixel difference value between corresponding pixels in comparison regions after position shifting correction, statistical information of the pixel difference value, or quantization information of the pixel difference value. Also, the difference information is the quotient calculated by dividing, by the total number of pixels in the comparison region, the cumulative pixel value of a pixel difference value between corresponding pixels in comparison regions after position shifting, that is, the difference information is a difference index attributed to one pixel. Alternatively, coordinate information of comparison regions which are converted into the sizes of a comparison source image and comparison destination image before equalization processing for the sizes of the comparison regions may be used, and processing according to the present invention may be adopted as pre-processing for post-processing which premises accurate alignment. An arbitrary combination of these pieces of information may be used as difference information.

In generating difference information, a pixel difference value between corresponding pixels in a comparison source region and comparison destination region after position shifting correction is calculated. A pixel whose pixel difference value is equal to or larger than a predetermined threshold is determined, and the pixel difference value of the pixel is quantized at a plurality of quantization steps. The quantization level and the position of the pixel are paired and stored. When the comparison source image is a color image, it is converted into a grayscale image. A lower limit quantization level for displaying a difference is designated, and pixels whose quantization levels are equal to or lower than the lower limit quantization level are displayed on the grayscale image in a color different for each quantization level. This makes it possible to intuitively recognize the difference between the comparison regions.

As a simpler method, a pixel difference value between corresponding pixels in a comparison source region and comparison destination region after position shifting correction is calculated. A pixel whose pixel difference value is equal to or larger than a predetermined threshold, and the position of the pixel are stored. When the comparison source image is a color image, it is converted into a grayscale image. Pixels whose pixel difference values are equal to or larger than the predetermined threshold are displayed in a predetermined color (prominent color, e.g., red) on the grayscale image. With this simple processing, the difference between the comparison regions can be intuitively recognized.

By setting the predetermined threshold to a positive value including 0, only the difference of a comparison destination image from a comparison source image can be displayed in a predetermined color (prominent color).

When not a comparison source image but a comparison destination image is used as a reference, the same display of difference information between them can be done. In this case, a grayscale image to be displayed in the above description is a comparison destination image. As difference information between corresponding pixels in a comparison source region and comparison destination region after position shifting correction, the difference of a pixel value in the comparison destination region is calculated from a corresponding pixel value in the comparison source region.

OTHER EMBODIMENT

In the above embodiment, the homothetic ratio of comparison regions in a comparison source image and comparison destination image is calculated. An entire image having a larger comparison region is reduced on the basis of the homothetic ratio, and coordinate information of the comparison region is also corrected in accordance with reduction processing. By reduction processing, the sizes of comparison regions in the comparison source image and comparison destination image are made equal to each other. However, the present invention is not limited to this.

For example, an entire image having a smaller comparison region is enlarged on the basis of the homothetic ratio, and the coordinates of the comparison region are also corrected in accordance with enlargement processing. This can also make the sizes of comparison regions in the comparison source image and comparison destination image equal to each other. This enlargement processing preferably adopts a method (e.g., affine transformation) which hardly degrades the image quality, in place of simple linear interpolation.

That is, according to the embodiment, the sizes of comparison regions in a comparison source image and comparison destination image are made equal to each other by scaling (enlarging/reducing) one of the sizes of the comparison regions. Not one but both of the sizes of the comparison regions in the comparison source image and comparison destination image may be properly scaled as far as the comparison regions become equal to each other.

In the above embodiment, the feature amount levels (number of colors and number of gray levels) of a comparison source image and comparison destination image are converted by adjusting the image of a higher feature amount level to that of a lower feature amount level. However, the present invention is not limited to this. For example, these images may be unconditionally converted to have a low feature amount level (number of colors and number of gray levels) for a higher speed.

For example, when both a comparison source image and comparison destination image are color images, 3-channel information must be processed. If, however, these color images are converted into grayscale images, the channel information is reduced to 1-channel information, and the cost of comparison processing reduces to roughly ⅓.

In the above embodiment, a difference image by difference image generation processing is overlaid and displayed by changing the color of pixels different at a plurality of quantization levels. However, the present invention is not limited to this. The pixel difference value of two corresponding pixels in the comparison regions of a comparison source image and comparison destination image after position shifting correction is calculated. Of pixel difference values, a pixel difference value which is equal to or larger than a predetermined threshold is stored in correspondence with the position of the pixel. If the comparison source image is a color image, it is converted into a grayscale image. Pixels whose pixel difference values are equal to or larger than the predetermined threshold are displayed in a predetermined color on the grayscale image. A display which allows the user to intuitively recognize the difference between the comparison regions can be presented.

In displaying a difference image, the quotient calculated by dividing a cumulative pixel difference value in the comparison region of a comparison image by the number of pixels in the comparison region may be displayed as an expected value of difference per pixel, in place of the above-mentioned image information. Needless to say, both of these values may be displayed, or a composite display form may be employed such that the comparison region is enclosed in a rectangle or blinked, in order to enhance the visibility of image display.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-244128 filed on Aug. 24, 2004, which is hereby incorporated by reference herein.

What is claimed is:

1. An image processing apparatus which decides a comparison position for performing similarity comparison between a comparison source image and a comparison destination image, comprising:

designation means for designating a block division count representing a division count for dividing an image;

dividing means for dividing each of the comparison source image and the comparison destination image into a plurality of blocks by the block division count designated by said designation means;

feature amount calculation means for calculating feature amounts of the comparison source image and the comparison destination image for each block divided by said dividing means;

storing means for storing a plurality of types of position shifting patterns for shifting comparison positions of the comparison source image and the comparison destination image;

similarity distance calculation means for calculating, on the basis of feature amounts of corresponding blocks in the comparison source image and the comparison destination image, a similarity distance between the comparison source image and the comparison destination image after the comparison positions are shifted by using the plurality of types of position shifting patterns;

position correction amount calculation means for calculating a position correction amount for correcting the comparison positions of the comparison source image and the comparison destination image that are used in performing next similarity comparison, on the basis of a size of the block and a position shifting pattern corresponding to a smallest similarity distance among similarity distances calculated by said similarity distance calculation means;

correction means for correcting the comparison positions of the comparison source image and the comparison destination image by the position correction amount;

executing means for, every time the position correction amount is calculated by said position correction amount calculation means, incrementing the block division count designated by said designation means, and recursively executing said means from said dividing means to said correction means;

determination means for determining whether to end recursive processing; and finalizing means for, when the recursive processing is to be ended on the basis of a determination result by said determination means, finalizing a comparison position at that time as final comparison positions of the comparison source image and the comparison destination image.

2. The apparatus according to claim 1, further comprising deciding means for deciding a comparison source region of the comparison source image and a comparison destination region of the comparison destination image, wherein said dividing means divides each of an image in the comparison source region and an image in the comparison destination region into a plurality of blocks.

3. The apparatus according to claim 2, further comprising scaling means for, when a size of the comparison source region and a size of the comparison destination region which are decided by said deciding means are different, scaling at least one region so as to make the sizes equal to each other.

4. The apparatus according to claim 1, further comprising generation means for generating difference information between the comparison source image and the comparison destination image on the basis of the comparison positions finalized by said finalizing means.

5. The apparatus according to claim 2, further comprising level conversion means for, when feature amount levels of the images in the comparison source region and the comparison destination region which are decided by said deciding means are different, converting the feature amount level of the image in at least one region so as to make the feature amount levels equal to each other.

6. The apparatus according to claim 2, wherein when both the image in the comparison source region and the image in the comparison destination region are color images, said feature amount calculation means calculates, as the feature amount, an average of color channels in each color image for each block divided by said dividing means, when one of the image in the comparison source region and the image in the comparison destination region is a color image and the other is a grayscale image, or both of the images are grayscale images, said feature amount calculation means calculates an average brightness of each image as the feature amount for each block divided by said dividing means, and when at least one of the image in the comparison source region and the image in the comparison destination region is a binary image, said feature amount calculation means calculates, as the feature amount for each block divided by said dividing means, a value which is a majority of the binary image.

7. The apparatus according to claim 4, wherein when both the image in the comparison source region and the image in the comparison destination region are color images, said generation means generates difference information on the color images on the basis of the position correction amount finalized by said finalizing means, when one of the image in the comparison source region and the image in the comparison destination region is a color image and the other is a grayscale image, or both of the images are grayscale images, said generation means generates difference information on the grayscale images on the basis of the position correction amount finalized by said finalizing means, and when at least one of the image in the comparison source region and the image in the comparison destination region is a binary image, said generation means generates difference information on the binary image on the basis of the position correction amount finalized by said finalizing means.

8. The apparatus according to claim 7, further comprising scaling means for, when a size of the comparison source region and a size of the comparison destination region which are decided by said deciding means are different, scaling at least one region so as to make the sizes equal to each other, wherein said generation means generates, on the basis of the position correction amount finalized by said finalizing means, difference information between the image in the comparison source region and the image in the comparison destination region after scaling by said scaling means.

9. The apparatus according to claim 1, wherein position shifting directions defined by the plurality of types of position shifting patterns are a total of five directions including two horizontal directions, two vertical directions, and one fixed direction.

10. The apparatus according to claim 1, wherein position shifting directions defined by the plurality of types of position shifting patterns are a total of nine directions including two horizontal directions, two vertical directions, four oblique directions, and one fixed direction.

11. The apparatus according to claim 1, wherein said designation means comprises block division count calculation means for calculating a block division count larger than the block division count in previous similarity comparison by multiplying the block division count in previous similarity comparison by a predetermined constant, and said executing means updates the block division count calculated by said block division count calculation means as a new block division count every time the position correction amount is calculated by said position correction amount calculation means unless the block division count calculated by said block division count calculation means exceeds an upper limit block division count.

12. The apparatus according to claim 1, wherein when a second smallest similarity distance which falls within a product of the smallest similarity distance multiplied by a first constant exists in similarity distances calculated by said similarity distance calculation means, said position correction amount calculation means calculates a position correction amount for correcting the comparison positions of the comparison source image and the comparison destination image that are used in performing next similarity comparison, on the basis of the size of the block and position shifting patterns corresponding to the smallest similarity distance and the second smallest similarity distance, and when a second smallest similarity distance which falls within the product of the smallest similarity distance multiplied by the first constant does not exist, said position correction amount calculation means calculates a position correction amount for correcting the comparison positions of the comparison source image and the comparison destination image that are used in performing next similarity comparison, on the basis of the size of the block and a position shifting pattern corresponding to the smallest similarity distance.

13. The apparatus according to claim 1, wherein said designation means designates, as the block division count, a horizontal block division count for dividing the comparison region in a horizontal direction and a vertical block division count for dividing the comparison region in a vertical direction, said position correction amount calculation means calculates the position correction amount which contains a lateral component corresponding to the horizontal direction and a longitudinal component corresponding to the vertical direction, when a horizontal block division count obtained by multiplying the horizontal block division count in previous similarity comparison by a predetermined constant exceeds an upper limit horizontal block division count, the longitudinal component of the position correction amount is set to a value obtained by multiplying a longitudinal component of the position shifting pattern by the vertical block division count, and the lateral component of the position correction amount is set to a value of a lateral component of the position shifting pattern, when a vertical block division count obtained by multiplying the vertical block division count in previous similarity comparison by a predetermined constant exceeds an upper limit vertical block division count, the longitudinal component of the position correction amount is set to a value of the longitudinal component of the position shifting pattern, and the lateral component of the position correction amount is set to a value obtained by multiplying the lateral component of the position shifting pattern by the horizontal block-division count, and when the horizontal block division count obtained by multiplying the horizontal block division count in previous similarity comparison by the predetermined constant exceeds the upper limit horizontal block division count, and the vertical block division count obtained by multiplying the vertical block division count by the predetermined constant exceeds the upper limit vertical block division count, the longitudinal component of the position correction amount is set to the value obtained by multiplying the longitudinal component of the position shifting pattern by the vertical block division count, and the lateral component of the position correction amount is set to the value obtained by multiplying the lateral component of the position shifting pattern by the horizontal block division count.

14. The apparatus according to claim 1, wherein said determination means determines whether to end the recursive processing, on the basis of a processing count of the recursive processing after the block division count designated by said designation means reaches an upper limit block division count.

15. The apparatus according to claim 1, wherein said determination means determines whether to end the recursive processing, on the basis of the position correction amount in determination and a processing count of the recursive processing after the block division count designated by said designation means reaches an upper limit block division count.

16. The apparatus according to claim 1, wherein said determination means determines whether to end the recursive processing, on the basis of a processing count of the recursive processing, the position correction amount in determination, the block division count, and the smallest similarity distance.

17. The apparatus according to claim 2, wherein an upper limit block division count of the block division count designated by said designation means is decided by a size of the comparison region.

18. The apparatus according to claim 1, wherein
said designation means comprises block division count calculation means for calculating a block division count larger than the block division count in previous similarity comparison by multiplying the block division count in previous similarity comparison by a predetermined constant, and
the predetermined constant is a value falling within a range from 1.0 to 2.0.

19. The apparatus according to claim 4, wherein said generation means generates the difference information on the basis of one of a pixel difference value between corresponding pixels in the comparison source image and the comparison destination image, a value calculated by dividing a cumulative value of an absolute pixel difference value between pixels by the number of pixels in the comparison region, coordinate information which is converted into a size of each of the comparison source image and the comparison destination image, and a combination thereof.

20. The apparatus according to claim 4, wherein
said generation means comprises
acquisition means for acquiring a pixel difference value which is not less than a predetermined threshold among pixel difference values between corresponding pixels in the comparison source image and the comparison destination image, and
quantization means for quantizing the pixel difference value acquired by said acquisition means, and
said generation means generates, as the difference information, an image in which in the comparison source image, a pixel having a pixel difference value which belongs to each quantization level of said quantization means is displayed in a color different for each quantization level.

21. The apparatus according to claim 4, wherein
said generation means comprises acquisition means for acquiring a pixel difference value which is not less than a predetermined threshold among pixel difference values between corresponding pixels in the comparison source image and the comparison destination image, and
said generation means generates, as the difference information, an image in which in the comparison source region, a pixel corresponding to a pixel difference value acquired by said acquisition means is displayed in a predetermined color.

22. The apparatus according to claim 20 or 21, wherein the predetermined threshold is a positive value including 0.

23. An image processing method of deciding a comparison position for performing similarity comparison between a comparison source image and a comparison destination image, comprising:
a designation step of designating a block division count representing a division count for dividing an image;
a dividing step of dividing each of the comparison source image and the comparison destination image into a plurality of blocks by the block division count designated in the designation step;
a feature amount calculation step of calculating feature amounts of the comparison source image and the comparison destination image for each block divided in the dividing step;
a similarity distance calculation step of calculating, on the basis of feature amounts of corresponding blocks in the comparison source image and the comparison destination image, a similarity distance between the comparison source image and the comparison destination image after comparison positions are shifted by using a plurality of types of position shifting patterns for shifting the comparison positions of the comparison source image and the comparison destination image;
a position correction amount calculation step of calculating a position correction amount for correcting the comparison positions of the comparison source image and the comparison destination image that are used in performing next similarity comparison, on the basis of a size of the block and a position shifting pattern corresponding to a smallest similarity distance among similarity distances calculated in the similarity distance calculation step;
a correction step of correcting the comparison positions of the comparison source image and the comparison destination image by the position correction amount;
an executing step of, every time the position correction amount is calculated in the position correction amount calculation step, incrementing the block division count designated in the designation step, and recursively executing the steps from the dividing step to the correction step;
a determination step of determining whether to end recursive processing; and
a finalizing step of, when the recursive processing is to be ended on the basis of a determination result in the determination step, finalizing a comparison position at that time as final comparison positions of the comparison source image and the comparison destination image.

24. The method according to claim 23, further comprising a deciding step of deciding a comparison source region of the comparison source image and a comparison destination region of the comparison destination image,
wherein in the dividing step, each of an image in the comparison source region and an image in the comparison destination region is divided into a plurality of blocks.

25. A computer readable medium storing a computer program for implementing image processing of deciding a comparison position for performing similarity comparison between a comparison source image and a comparison destination image, comprising:
a program code for a designation step of designating a block division count representing a division count for dividing an image;
a program code for a dividing step of dividing each of the comparison source image and the comparison destination image into a plurality of blocks by the block division count designated in the designation step;
a program code for a feature amount calculation step of calculating feature amounts of the comparison source image and the comparison destination image for each block divided in the dividing step;
a program code for a similarity distance calculation step of calculating, on the basis of feature amounts of corresponding blocks in the comparison source image and the comparison destination image, a similarity distance between the comparison source image and the comparison destination image after comparison positions are shifted by using a plurality of types of position shifting patterns for shifting the comparison positions of the comparison source image and the comparison destination image;
a program code for a position correction amount calculation step of calculating a position correction amount for correcting the comparison positions of the comparison source image and the comparison destination image that are used in performing next similarity comparison, on the basis of a size of the block and a position shifting pattern corresponding to a smallest similarity distance among similarity distances calculated in the similarity distance calculation step;

a program code for a correction step of correcting the comparison positions of the comparison source image and the comparison destination image by the position correction amount;

a program code for an executing step of, every time the position correction amount is calculated in the position correction amount calculation step, incrementing the block division count designated in the designation step, and recursively executing the steps from the dividing step to the correction step;

a program code for a determination step of determining whether to end recursive processing; and a program code for a finalizing step of, when the recursive processing is to be ended on the basis of a determination result in the determination step, finalizing a comparison position at that time as final comparison positions of the comparison source image and the comparison destination image.

\* \* \* \* \*

UNITED STATES PATENT AND TRADEMARK OFFICE
CERTIFICATE OF CORRECTION

PATENT NO. : 7,418,135 B2
APPLICATION NO. : 11/202076
DATED : August 26, 2008
INVENTOR(S) : Hirotaka Shiiyama Page 1 of 1

It is certified that error appears in the above-identified patent and that said Letters Patent is hereby corrected as shown below:

DRAWINGS:
    Sheet 2, FIG. 2, "COMPARISONDESTINATION" should read
-- COMPARISON DESTINATION --; and
    Sheet 9, FIG. 9, "COMPARISONSOURCE" should read
-- COMPARISON SOURCE --.

COLUMN 8:
    Line 44, "as an" should read -- as --.

COLUMN 13:
    Line 35, "vector+V(i)" should read -- vector V(i) --.

COLUMN 14:
    Line 47, "P" should read -- B --.

COLUMN 16:
    Line 7, "·" should read -- i --.

Signed and Sealed this

Seventh Day of April, 2009

JOHN DOLL
*Acting Director of the United States Patent and Trademark Office*